(12) United States Patent
Tsuchiya

(10) Patent No.: US 12,401,881 B2
(45) Date of Patent: Aug. 26, 2025

(54) IMAGE PICKUP APPARATUS, ACCESSORY, IMAGE PICKUP SYSTEM, CONTROL METHOD FOR IMAGE PICKUP APPARATUS, CONTROL METHOD FOR ACCESSORY, AND STORAGE MEDIUM

(71) Applicant: CANON KABUSHIKI KAISHA, Tokyo (JP)

(72) Inventor: Takuo Tsuchiya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 144 days.

(21) Appl. No.: 18/459,631

(22) Filed: Sep. 1, 2023

(65) Prior Publication Data

US 2024/0080541 A1 Mar. 7, 2024

(30) Foreign Application Priority Data

Sep. 6, 2022 (JP) .................................. 2022-141705

(51) Int. Cl.
| | |
|---|---|
| *H04N 23/60* | (2023.01) |
| *G06F 1/26* | (2006.01) |
| *G06F 8/65* | (2018.01) |
| *H04R 1/08* | (2006.01) |
| *H04R 3/00* | (2006.01) |

(52) U.S. Cl.
CPC ............ *H04N 23/60* (2023.01); *G06F 1/266* (2013.01); *G06F 8/65* (2013.01); *H04R 1/08* (2013.01); *H04R 3/00* (2013.01); *H04R 2499/11* (2013.01)

(58) Field of Classification Search
CPC ...... H04N 23/60; H04N 23/65; H04N 23/663; H04N 23/50; G06F 1/266; G06F 8/65; G06F 8/654; H04R 1/08; H04R 3/00; H04R 2499/11
See application file for complete search history.

(56) References Cited

U.S. PATENT DOCUMENTS

| | | | |
|---|---|---|---|
| 8,214,653 B1* | 7/2012 | Marr ......................... | G06F 8/65 |
| | | | 713/150 |
| 9,081,636 B2* | 7/2015 | Kwak ....................... | G06F 8/60 |
| 9,093,015 B2* | 7/2015 | Na ...................... | H04N 21/4436 |
| 10,312,697 B1* | 6/2019 | Stieber .................. | H02J 7/0013 |
| 11,184,533 B2* | 11/2021 | Hashimoto ............ | H04N 23/65 |

(Continued)

FOREIGN PATENT DOCUMENTS

JP 2002-176582 A 6/2002

*Primary Examiner* — Chiawei Chen
(74) *Attorney, Agent, or Firm* — Cowan, Liebowitz & Latman, P.C.

(57) ABSTRACT

An image pickup apparatus is attachable to and detachable from an accessory. The image pickup apparatus includes a communication unit configured to communicate with the accessory, a power supplying unit configured to supply power to the accessory, a memory configured to store instructions, and a processor configured to execute the instructions and instruct the accessory to update software stored in the accessory via the communication unit. The accessory is operable with power supplied from a first power supply provided in the accessory. The image pickup apparatus is operable with power supplied from a second power supply provided in the image pickup apparatus. The processor supplies the power from the second power supply to the accessory in updating the software.

19 Claims, 18 Drawing Sheets

(56) References Cited

U.S. PATENT DOCUMENTS

| | | | |
|---|---|---|---|
| 11,265,495 B2* | 3/2022 | Hashimoto | G03B 17/56 |
| 12,108,144 B2* | 10/2024 | Nabeshima | H04N 23/661 |
| 2012/0274836 A1* | 11/2012 | Mori | H04N 1/00962 |
| | | | 348/360 |
| 2013/0028590 A1* | 1/2013 | Hasuda | G03B 17/566 |
| | | | 396/530 |
| 2016/0011887 A1* | 1/2016 | Chung | G06F 8/654 |
| | | | 713/2 |
| 2017/0180638 A1* | 6/2017 | Saito | G03B 17/14 |
| 2017/0235214 A1* | 8/2017 | Seki | G03B 17/565 |
| | | | 396/529 |
| 2021/0397440 A1* | 12/2021 | Sayyed | G06F 1/3212 |
| 2022/0222063 A1* | 7/2022 | Bang | H04B 3/54 |
| 2022/0391188 A1* | 12/2022 | Sayyed | H04L 41/082 |
| 2023/0138510 A1* | 5/2023 | Shizuka | B60R 16/033 |
| | | | 717/168 |
| 2024/0069904 A1* | 2/2024 | Cho | H02J 7/0047 |

* cited by examiner

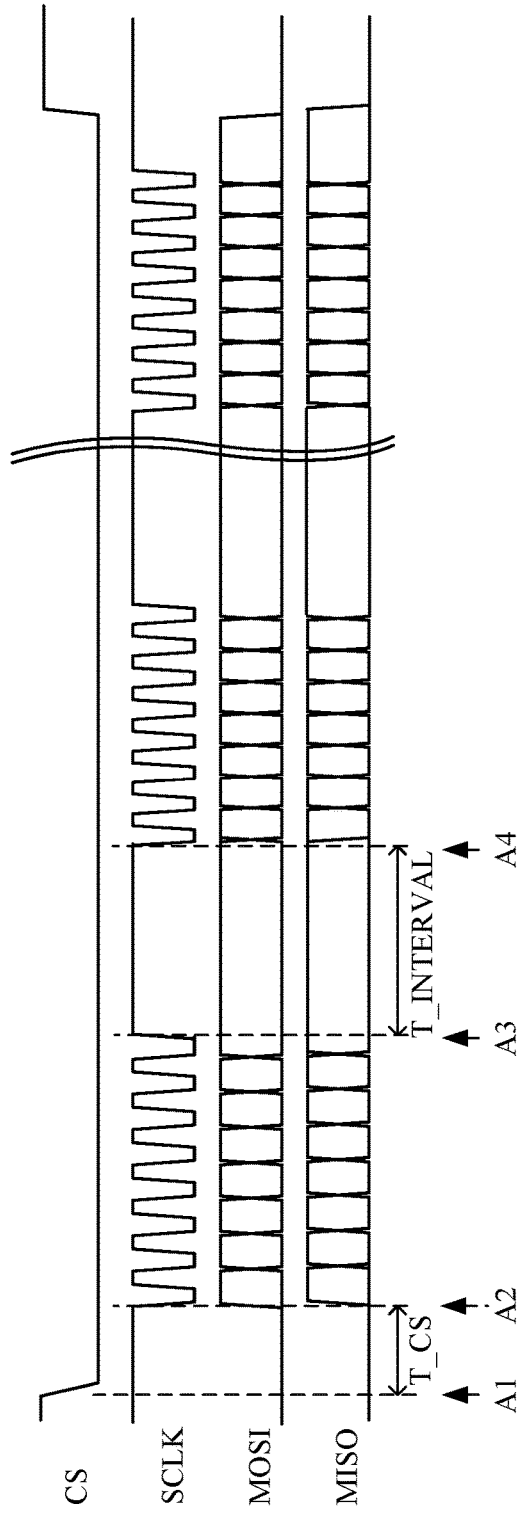
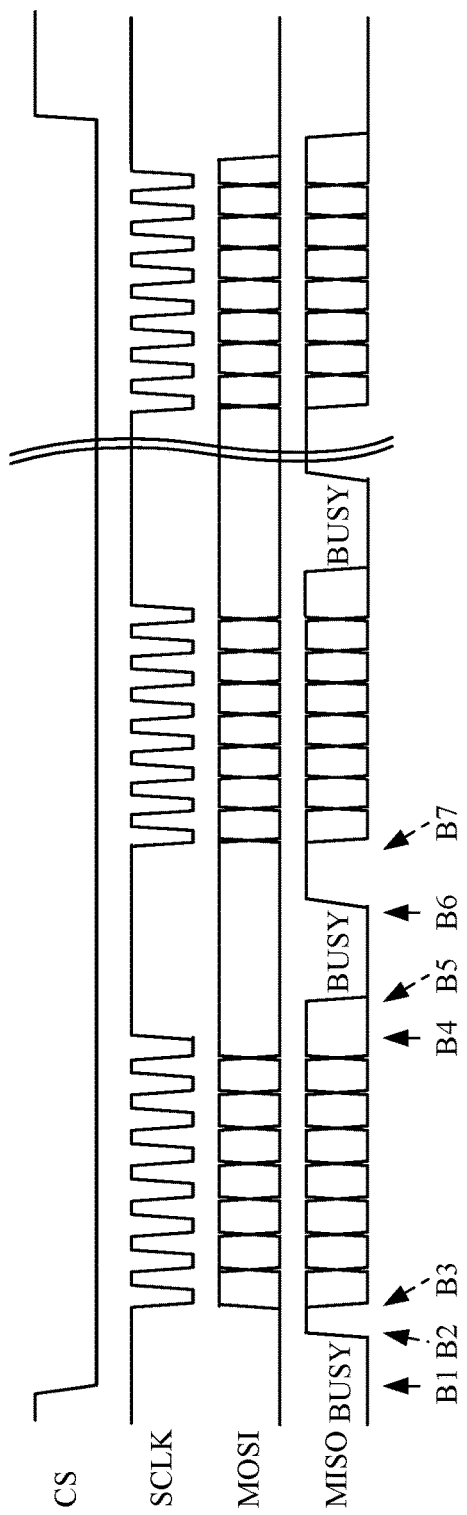
FIG. 2A
FIG. 2B

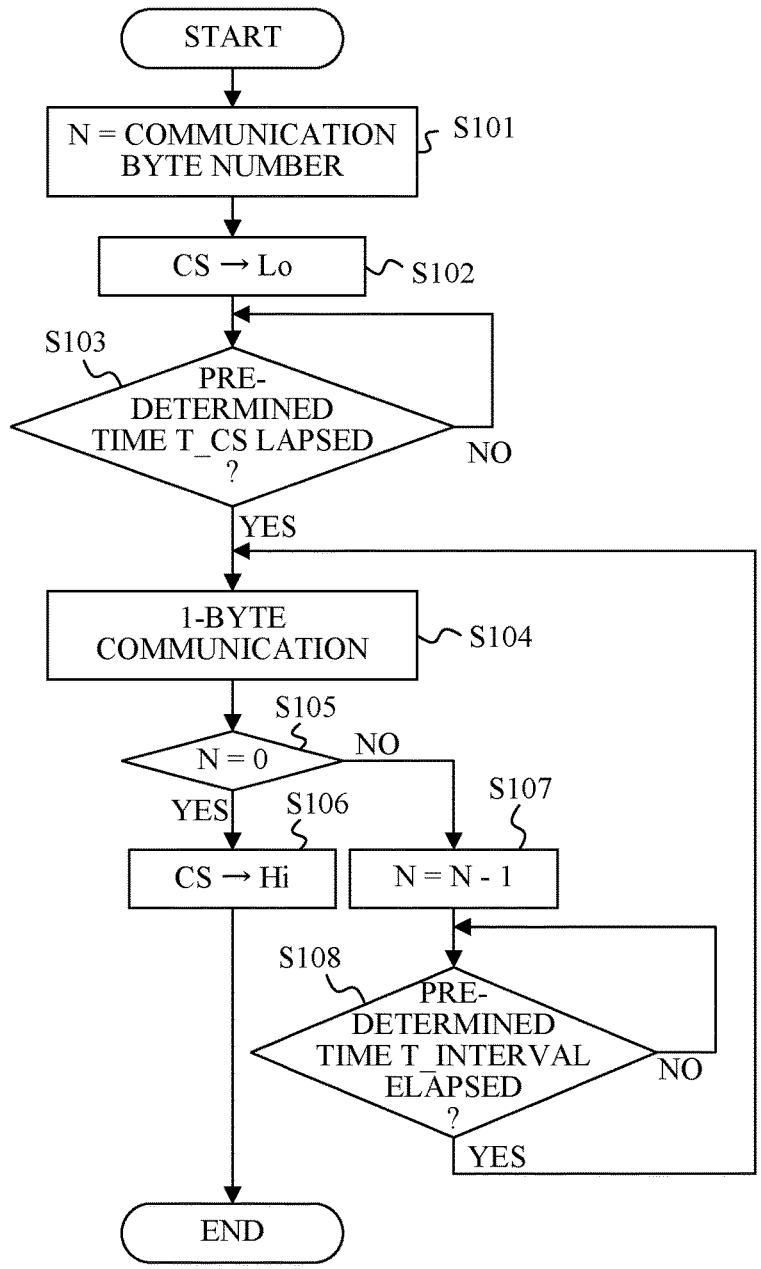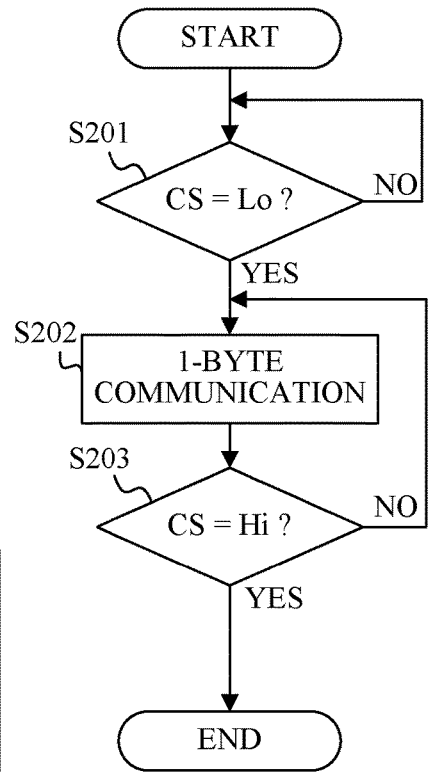
FIG. 2C                    FIG. 2D

| | 1ST BYTE | 2ND BYTE | 3RD BYTE | ... | (N-2)TH BYTE | (N-1)TH BYTE | NTH BYTE |
|---|---|---|---|---|---|---|---|
| MOSI DATA | CMD | MOSI_DATA1 | MOSI_DATA2 | ... | MOSI_DATA[N-3] | CheckSum_C | 0x00 |
| MISO DATA | 0xA5 | CMD | MISO_DATA1 | ... | MISO_DATA[N-4] | 0x00 | CheckSum_A |

FIG. 3

| ADDRESS | D7 | D6 | D5 | D4 | D3 | D2 | D1 | D0 |
|---|---|---|---|---|---|---|---|---|
| 0x00 | ACC TYPE ||||||||
| 0x01 | ACC ID NO. ||||||||
| 0x02 | FIRMWARE VER. ||||||||
| 0x03 | POWER SUPPLY DURING POWER-OFF || POWER SUPPLY DURING AUTOMATIC POWER-OFF || POWER SUPPLY SPECIFICATION ||| CHARGEABILITY |
| 0x04 | REQUEST POWER ||||||||
| 0x05 | FIRMWARE UPDATE MODE | FIRMWARE UPDATE FUNCTION | INTERMEDIATE ACCESSORY OPERATION PERMISSION || INTERMEDIATE ACCESSORY CONFIRMATION AT START ||| I2C COMMAND COMMUNICATION AVAILABILITY |
| 0x06 | RESERVE || COMMUNICATION REQUEST FACTOR ACQUIRING METHOD || FUNCTIONAL SIGNAL 4 | FUNCTIONAL SIGNAL 3 | FUNCTIONAL SIGNAL 2 | FUNCTIONAL SIGNAL 1 |
| 0x07 | RESERVE ||||||||
| 0x08 | RESERVE ||||||||
| 0x09 | RESERVE ||||||||
| 0x0A | SILENT START | COMMUNICATION REQUEST FACTOR |||||||
| 0x0B | COMMUNICATION REQUEST FACTOR ||||||||
| 0x0C | RESERVE |||||| SPI PROTOCOL | CS LOGIC |
| 0x0D | COMMUNICATION INTERVAL BETWEEN SPI BYTES ||||||||
| 0x0E | COMMUNICATION INTERVAL BETWEEN SPI BYTES (IN FIRMWARE UPDATE MODE) ||||||||
| 0x0F | CHECKSUM ||||||||

FIG. 4

| NO. | TYPE |
|---|---|
| 0x00 | RESERVE |
| 0x01 | RESERVE |
| : | : |
| 0x80 | RESERVE |
| 0x81 | STROBE |
| 0x82 | INTERFACE CONVERSION ADAPTER |
| 0x83 | MICROPHONE |
| 0x84 | MULTI-ACCESSORY CONNECTION ADAPTER |
| 0x85 | RESERVE |
| 0x86 | RESERVE |
| 0x87 | RESERVE |
| 0x88 | RESERVE |
| 0x89 | RESERVE |
| 0x90 | RESERVE |
| : | : |
| 0xFF | RESERVE |

FIG. 6

| FACTOR NO. | FACTOR CONTENT |
|---|---|
| 0x00 | PRESS OF MENU CALL SW |
| 0x01 | VOICE STABILIZATION COMPLETION |
| 0x02 | VOICE UNMUTE |
| 0x03 | |
| 0x04 | |
| 0x05 | |
| 0x06 | |
| 0x07 | |
| : | |
| 0x79 | |
| 0x7A | |
| 0x7B | |
| 0x7C | |
| 0x7D | |
| 0x7E | |
| 0x7F | |

FIG. 7

| | COMMUNICATION INTERVAL |
|---|---|
| 0 | 1us |
| 1 | 2us |
| 2 | 5us |
| 3 | 10us |
| 4 | 15us |
| 5 | 25us |
| 6 | 50us |
| 7 | 100us |

FIG. 8A

| | COMMUNICATION INTERVAL |
|---|---|
| 0 | 1ms |
| 1 | 2ms |
| 2 | 5ms |
| 3 | 10ms |
| 4 | 20ms |
| 5 | 50ms |
| 6 | 80ms |
| 7 | 100ms |

FIG. 8B

IMAGE PICKUP APPARATUS, ACCESSORY, IMAGE PICKUP SYSTEM, CONTROL METHOD FOR IMAGE PICKUP APPARATUS, CONTROL METHOD FOR ACCESSORY, AND STORAGE MEDIUM

BACKGROUND

Technical Field

One of the aspects of the embodiment relates to an image pickup apparatus, an accessory, an image pickup system, a control method for an image pickup apparatus, a control method for an accessory, and a storage medium.

Description of Related Art

Firmware updating methods for products have conventionally known. Updating the firmware can add new functions, correct bugs, and improve the product functions and quality. However, if the power is suddenly cut off during the firmware update, the operation may not be able to be restored to the normal operation. Japanese Patent Laid-Open No. 2002-176582 discloses a method of switching between an external power supply and a built-in power supply to prevent sudden power cutoff during firmware updating.

The method disclosed in Japanese Patent Laid-Open No. 2002-176582 is applicable only in a case where the product can detect its own power supply state, and cannot be applied in a case where firmware update is instructed from the outside. For example, in a combination of an image pickup apparatus and an accessory that is attachable to and detachable from the image pickup apparatus, in a case where the image pickup apparatus instructs the accessory to update the firmware of the accessory (software stored in the accessory), only the power to the accessory may be unexpectedly turned off.

SUMMARY

An image pickup apparatus according to one aspect of the embodiment is attachable to and detachable from an accessory. The image pickup apparatus includes a communication unit configured to communicate with the accessory, a power supplying unit configured to supply power to the accessory, a memory configured to store instructions, and a processor configured to execute the instructions and instruct the accessory to update software stored in the accessory via the communication unit. The accessory is operable with power supplied from a first power supply provided in the accessory. The image pickup apparatus is operable with power supplied from a second power supply provided in the image pickup apparatus. The processor supplies the power from the second power supply to the accessory in updating the software.

An accessory according to another aspect of the embodiment is attachable to and detachable from an image pickup apparatus. The accessory includes a communication unit configured to communicate with the image pickup apparatus, a power receiving unit configured to receive power from the image pickup apparatus, a memory storing software for controlling the accessory, and a processor configured to control the accessory based on the software. The accessory is operable with power supplied from a first power supply provided in the accessory. The image pickup apparatus is operable with power supplied from a second power supply provided in the image pickup apparatus. The processor updates the software stored in the memory using the power supplied from the second power supply.

An image pickup system including the above image pickup apparatus and the accessory also constitute another aspect of the embodiment. A control method for an image pickup apparatus and a control method for an accessory corresponding to the above image pickup apparatus and the accessory also constitute another aspect of the embodiment. A storage medium storing a program that causes a computer to execute each of the above control methods also constitutes another aspect of the embodiment.

Further features of the disclosure will become apparent from the following description of exemplary embodiments with reference to the attached drawings.

BRIEF DESCRIPTION OF THE DRAWINGS

FIG. 2A is a schematic diagram of a communication waveform of SPI protocol A according to each embodiment.

FIG. 2B is a schematic diagram of a communication waveform of SPI protocol B according to each embodiment.

FIG. 2C is a flowchart illustrating an operation of a camera control circuit B with the SPI protocol A according to each embodiment.

FIG. 2D is a flowchart illustrating an operation of an accessory control circuit with the SPI protocol A according to each embodiment.

FIG. 3 explains SPI communication contents according to each embodiment.

FIG. 4 explains accessory information according to each embodiment.

FIG. 6 explains accessory information according to each embodiment.

FIG. 7 explains a factor number and a factor content of a communication request according to each embodiment.

FIGS. 8A and 8B explain communication data interval information in SPI communication according to each embodiment.

DESCRIPTION OF THE EMBODIMENTS

Referring now to the accompanying drawings, a detailed description will be given of embodiments according to the disclosure.

Figure 1:
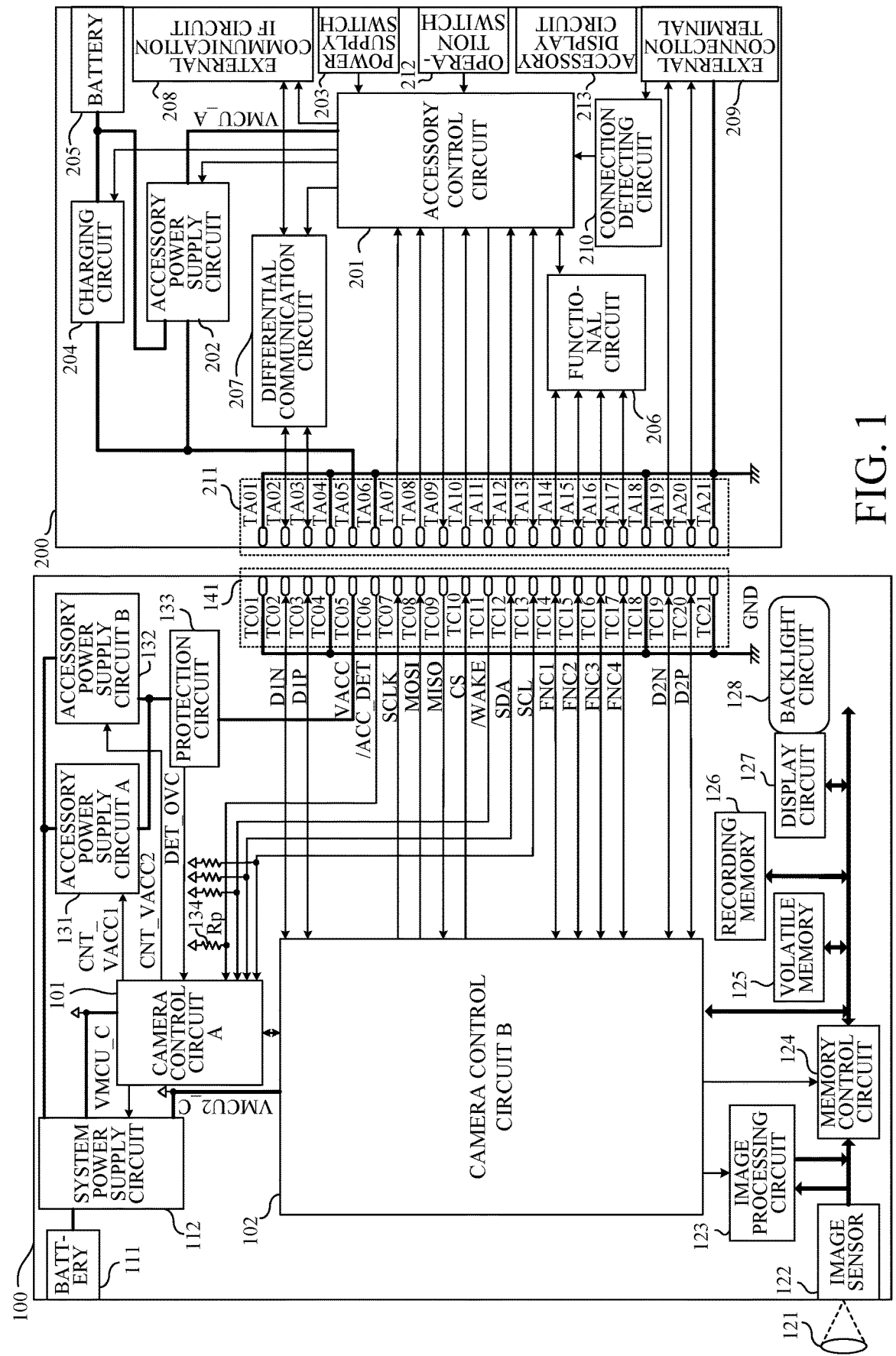
FIG. 1 is a configuration diagram of an image pickup system according to each embodiment.

Referring now to FIG. 1, a description will be given of an image pickup system 10 according to this embodiment. FIG. 1 is a configuration diagram of the image pickup system 10. The image pickup system 10 includes a camera (image pickup apparatus) 100 and an accessory 200 detachably attached to the camera 100. The camera 100 and the accessory 200 are electrically connected via one-to-one contacts between a plurality of contacts (terminals) TC01 to TC21 of a camera connector 141 of the camera 100 and a plurality of contacts TA01 to TA21 of an accessory connector 211 of the accessory 200, respectively. A camera connector 141 is a communication unit (camera communication unit) configured to communicate with the accessory 200. An accessory connector 211 is a communication unit (accessory communication unit) configured to communicate with the camera 100.

The camera 100 operates with power supplied from a battery (second power supply) 111. The battery 111 is attachable to and detachable from the camera 100. A camera control circuit A 101 and a camera control circuit B 102 are circuits that control the entire camera 100, and are control units (camera control units) including a processor (microcomputer) that includes a CPU, etc. The camera control circuit A101 monitors a switch or the like for unillustrated camera operations. The camera control circuit A101 operates even in a case where the camera 100 is in the standby state (low power consumption mode), and controls a system power supply and the like in accordance with an operation of the user. The camera control circuit B 102 is responsible for controlling an image sensor 122, a display circuit 127, and the like, and stops operating in a case where the camera 100 is in the standby state (low power consumption mode).

A system power supply circuit 112 is a circuit that generates power to be supplied to each circuit in the camera 100, and includes a DC/DC converter circuit, Low Drop Out (LDO), a charge pump circuit, and the like. A voltage of 1.8 V that is generated by the system power supply circuit 112 that receives power from the battery 111 is constantly supplied as camera microcomputer power supply VMCU_C to the camera control circuit A101. Several types of voltages that are generated by the system power supply circuit 112 are supplied as camera microcomputer power supply VMCU2_C to the camera control circuit B 102 at an arbitrary timing. The camera control circuit A 101 controls turning on and off of the power supply to each circuit in the camera 100 by controlling the system power supply circuit 112.

An optical lens (imaging optical system) 121 is attachable to and detachable from the camera 100. Light from an object incident through the optical lens 121 is imaged on the image sensor 122, such as a CMOS sensor or a CCD sensor. An object image formed on the image sensor 122 is encoded into a digital imaging signal. An image processing circuit 123 performs image processing such as noise reduction processing and white balance processing for the digital imaging signal to generate image data, and converts the image data into an image file in a JPEG format or the like in order to record the image data in a recording memory 126.

The image processing circuit 123 generates from the image data VRAM image data to be displayed on the display circuit 127.

A memory control circuit 124 controls transmissions and receptions of image data and other data generated by the image processing circuit 123 and the like. A volatile memory 125 is a memory capable of high-speed reading and writing such as DDR3SDRAM, and is used as a workspace for image processing that is performed by the image processing circuit 123. The recording memory 126 is a readable and writable recording medium such as an SD card or a CFexpress card that is attachable to and detachable from the camera 100 via an unillustrated connector. The display circuit 127 is a display disposed on a back surface of the camera 100, and includes an LCD panel, an organic EL display panel, and the like. A backlight circuit 128 adjusts the brightness of the display circuit 127 by changing the light amount of the backlight of the display circuit 127.

Each of a power supply circuit A for the accessory (accessory power supply circuit A hereinafter) 131 and a power supply circuit B for the accessory (accessory power supply circuit B hereinafter) 132 serves as a power supplying unit, is a voltage conversion circuit that converts voltage supplied from the system power supply circuit 112 into predetermined voltage, and generates 3.3 V as accessory power supply VACC in this embodiment. The accessory power supply circuit A 131 is a power supply circuit that includes LDO or the like and has a low self-power consumption. The accessory power supply circuit B 132 includes a DC/DC converter circuit or the like, and can pass current larger than that of the accessory power supply circuit A 131. The self-consumption power of the accessory power supply circuit B 132 is larger than that of the accessory power supply circuit A 131. Therefore, in a case where a load current is small, the accessory power supply circuit A 131 is more efficient than the accessory power supply circuit B 132, and in a case where the load current is large, the accessory power supply circuit B 132 is more efficient than the accessory power supply circuit A 131. The camera control circuit A 101 controls turning on and off of voltage outputs of the accessory power supply circuits A 131 and B 132 according to the operation state of the accessory 200.

A protection circuit 133 includes a current fuse element, an electronic fuse circuit in which a poly-switch element or a resistor, an amplifier, and a switching element are combined, or the like. The protection circuit 133 outputs overcurrent detecting signal DET_OVC in a case where power supply current values supplied to the accessory 200 from the accessory power supply circuits A 131 and B 132 are higher than a predetermined value and become excessive (abnormal). In this embodiment, the protection circuit 133 is the electronic fuse circuit, and notifies the camera control circuit A 101 of the overcurrent detecting signal DET_OVC in a case where a current of 1 A or more flows. The overcurrent detecting signal DET_OVC indicates the overcurrent by becoming at a high level.

The camera connector 141 is a connector for an electrical connection with the accessory 200 via 21 contacts TC01 to TC21 that are arranged in a row. The contacts TC01 to TC21 are arranged in this order from one end to the other end in this arrangement direction. The contact TC01 is connected to the ground (GND) and serves not only as a reference potential contact but also as a contact for controlling wiring impedances of differential signals MN and D1P. The contact TC01 corresponds to a third ground contact.

The differential signal MN that is connected to the contact TC02 and the differential signal D1P that is connected to the contact TC03 are differential data communication signals that perform data communications in pairs, and are connected to the camera control circuit B 102. The contacts TC02, TC03, TC07 to TC17 described below, TC19 and TC20 are communication contacts. The contact TC04 as a first ground contact is connected to GND and serves as a reference potential contact for the camera 100 and the accessory 200. The contact TC04 is disposed outside the contact TC05 described below in the contact arrangement direction. The accessory power supply VACC generated by the accessory power supply circuits A 131 and B 132 is connected to the contact TC05 as a power supply contact via the protection circuit 133.

An accessory attachment detecting signal/ACC_DET is connected to the contact TC06 as an attachment detecting contact. The accessory attachment detecting signal/ACC_DET is pulled up to the camera microcomputer power supply VMCU_C via a resistor element Rp 134 (10 kΩ). The camera control circuit A 101 can detect whether or not the accessory 200 is attached by reading a signal level of the accessory attachment detecting signal/ACC_DET. In a case where the signal level (potential) of the accessory attachment detecting signal/ACC_DET is high (predetermined potential), it is detected that the accessory 200 is not attached, and in a case where it is a low level (GND potential as described below), it is detected that the accessory 200 is attached.

SCLK connected to the communication contact TC07, MOSI connected to a contact TC08, MISO connected to the contact TC09, and Chip Select (CS) connected to the contact TC10 are signals for Serial Peripheral Interface (SPI) communication in which the camera control circuit B 102 becomes a communication master. In this embodiment, the SPI communication has a communication clock frequency of 1 MHz, a data length of 8 bits (1 byte), and a bit order of MSB first, and a full-duplex communication method.

In this embodiment, the camera 100 and the accessory 200 can support two types of communication protocols for the SPI communication method. The first communication protocol is a method that does not confirm whether the accessory 200 is in a communicable state before the camera 100 outputs SCLK, and will be referred to as SPI protocol A in this embodiment. FIG. 2A is a schematic diagram of a communication waveform of the SPI protocol A. In FIG. 2A, a CS signal is low-active.

The camera control circuit B 102 changes CS into a low level at timing A1 and requests the accessory control circuit 201 for the SPI communication. At timing A2 predetermined time T_CS after the timing A1, the camera control circuit B 102 starts outputting SCLK and MOSI. Similarly, in a case where the accessory control circuit 201 detects a trailing edge of SCLK, the accessory control circuit 201 starts outputting MISO. The camera control circuit B 102 stops outputting SCLK at timing A3 in completing outputting 1-byte SCLK. The camera control circuit B 102 stops outputting SCLK at the timing A3 for predetermined time T_INTERVAL, resumes the output of SCLK at timing A4 after the T_INTERVAL has elapsed, and performs the next 1-byte communication.

FIG. 2C is a flowchart illustrating an operation of the camera control circuit B102 in the SPI protocol A. In step S101, the camera control circuit B 102 stores a numerical value indicating the number of bytes to be communicated in internal variable N. For example, 3 is stored in a case of 3-byte communication. Next, in step S102, the camera control circuit B 102 changes CS to a low level and requests the accessory for SPI communication. In step S103, the camera control circuit B 102 performs wait processing until predetermined time T_CS elapses after CS is changed to the low level. After the predetermined time T_CS elapses, the flow proceeds to step S104.

In step S104, the camera control circuit B 102 controls an SCLK output, a MOSI data output, and a MISO data input and performs 1-byte data communication. Next, in step S105, the camera control circuit B102 determines whether the internal variable N indicating the number of communication bytes is 0. In a case where the internal variable N is 0, the flow proceeds to step S106. On the other hand, in a case where the internal variable N is other than 0, the flow proceeds to step S107.

In step S107, the camera control circuit B 102 stores as new internal variable N a value obtained by decrementing the numerical value of the internal variable N indicating the number of communication bytes by 1. Next, in step S108, the camera control circuit B 102 performs wait processing until the predetermined time T_INTERVAL elapses after the 1-byte data communication in step S104 is completed. Then, after the predetermined time T_INTERVAL elapses, the flow returns to the processing in step S104, and the camera control circuit B 102 executes the same processing again. In step S106, the camera control circuit B 102 changes CS to a high level and ends a series of SPI communication.

FIG. 2D illustrates an operation of the accessory control circuit 201 in the SPI protocol A. In step S201, the accessory control circuit 201 determines whether or not CS has changed to a low level. In a case where the accessory control circuit 201 determines that CS has changed to the low level, the flow proceeds to step S202, and in a case where the accessory control circuit 201 determines that CS has not changed to the low level, the flow returns to step S211.

In step S202, the accessory control circuit 201 performs the 1-byte data communication by the MOSI data input control and MISO data output control in response to the SCLK signal input. Next, in step S203, the accessory control circuit 201 determines whether or not CS has changed to a high level. In a case where the accessory control circuit 201 determines that the CS has changed to the high level, the accessory control circuit 201 determines that the SPI communication has been completed. In a case where the accessory control circuit 201 determines that the CS has not changed to the high level, the flow returns to step S202 so that the accessory control circuit 201 performs the next 1-byte communication.

The second communication protocol is a method of confirming whether the accessory 200 is in a communicable state before the camera 100 outputs SCLK and will be referred to as SPI protocol B in this embodiment. FIG. 2B is a schematic diagram of a communication waveform of the SPI protocol B. At timing B1, the camera control circuit B102 changes CS to a low level and requests the accessory control circuit 201 for SPI communication. The camera control circuit B102 confirms the potential of MISO together with the communication request. In a case where the potential of MISO is a high level, the camera control circuit B102 determines that the accessory control circuit 201 is in a communicable state. On the other hand, in a case where the potential of MISO is a low level, the camera control circuit B102 determines that the accessory control circuit 201 is in an incommunicable state.

On the other hand, in a case where the accessory control circuit 201 detects a trailing edge of CS, the accessory control circuit 201 performs control for changing MISO to a high level in a case where the SPI communication is available, and performs control for changing MISO to a low level in a case where the communication is unavailable (B2). In a case where the camera control circuit B 102 confirms that MISO is at a high level at timing B3, the camera control circuit B 102 starts outputting SCLK and MOSI. The accessory control circuit 201 starts outputting MISO in detecting a trailing edge of SCLK. The camera control circuit B 102 stops outputting SCLK in a case where the 1-byte SCLK output is completed at timing B4.

After the 1-byte communication, the accessory control circuit 201 performs control for changing MISO to a high level in a case where the SPI communication is available, and control for changing MISO to a low level in a case where the SPI communication is unavailable (B5, B6). The camera control circuit B 102 confirms the potential of MISO at timing B7. In a case where MISO is at a high level, it is determined that the accessory control circuit 201 is in a communicable state, and in a case where MISO is at a low level, it is determined that the accessory control circuit 201 is in an incommunicable state.

Figure 2E:
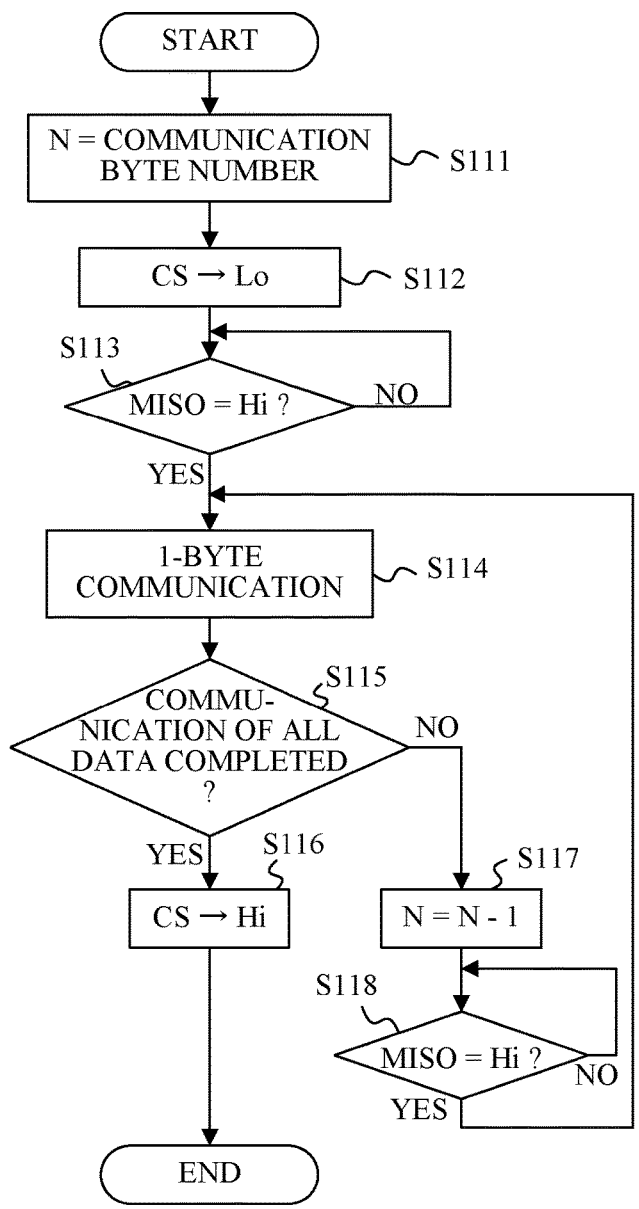
FIG. 2E is a flowchart illustrating an operation of the camera control circuit B with the SPI protocol B according to each embodiment.

FIG. 2E is a flowchart illustrating processing of the camera control circuit B 102 in the SPI protocol B. In step S111, the camera control circuit B 102 stores a numerical value indicating the number of bytes to be communicated in the internal variable N. For example, 3 is stored in the case of 3-byte communication. Next, in step S112, the camera control circuit B 102 changes CS to a low level and requests the accessory for SPI communication. Next, in step S113, the camera control circuit B 102 determines whether MISO has changed to a high level. In a case where it is determined that MISO is at the high level, the flow proceeds to step S114, and in a case where it is determined that MISO has not yet at the high level, the flow returns to step S113.

In step S114, the camera control circuit B 102 controls an SCLK output, a MOSI data output, and a MISO data input so as to perform 1-byte data communication. Next, in step S115, the camera control circuit B 102 determines whether or not the internal variable N indicating the number of communication bytes is 0. In a case where the camera control circuit B 102 determines that the internal variable N is 0, the flow proceeds to step S116, and in a case where the camera control circuit B 102 determines that the internal variable N is other than 0, the flow proceeds to step S117.

In step S117, the camera control circuit B 102 stores as new internal variable N a value obtained by decrementing the numerical value of the internal variable N indicating the number of communication bytes by 1. Next, in step S118, the camera control circuit B 102 determines whether or not MISO has changed to a high level. In a case where the camera control circuit B 102 determines that MISO is at the high level, the flow proceeds to step S114, and in a case where the camera control circuit B 102 determines that MISO has not yet been at the high level, the flow returns to step S118. In step S116, the camera control circuit B 102 changes CS to a high level and ends a series of SPI communications.

Figure 2F:
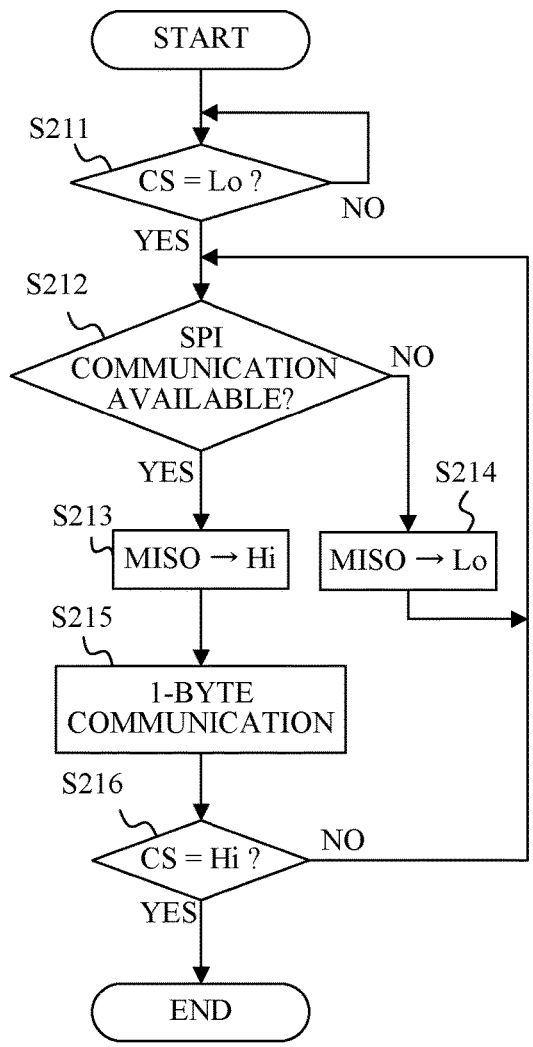
FIG. 2F is a flowchart illustrating an operation of the accessory control circuit with the SPI protocol B according to each embodiment.

FIG. 2F is a flowchart illustrating an operation of the accessory control circuit 201 in the SPI protocol B. In step S211, the accessory control circuit 201 determines whether or not CS has changed to a low level. In a case where the accessory control circuit 201 determines that CS has changed to the low level, the flow proceeds to step S212, and in a case where the accessory control circuit 201 determines that CS has not yet changed to the low level, the flow returns to step S211.

In step S212, the accessory control circuit 201 determines whether or not the SPI communication is available. In a case where the SPI communication is available, the flow proceeds to step S213, and in a case where in a case where the SPI communication is unavailable, the flow proceeds to step S214. In step S213, the accessory control circuit 201 performs control for changing MISO to a high level and the flow proceeds to step S215. In step S214, the accessory control circuit 201 performs control for changing MISO to a low level and the flow returns to step S212.

In step S215, the accessory control circuit 201 controls a MOSI data input and a MISO data output in response to the SCLK signal input and performs 1-byte data communication. Next, in step S216, the accessory control circuit 201 determines whether or not CS has changed to a high level. In a case where CS has changed to the high level, the accessory control circuit 201 determines that the SPI communication has been completed, and in a case where CS has not changed to the high level, the flow returns to step S212 so as to perform the next 1-byte communication.

FIG. 3 explains communication contents in notifying an operation execution instruction (command) from the camera 100 to the accessory 200 by the SPI communication in this embodiment.

The camera control circuit B 102 transmits as MOSI data information CMD indicating a command number to the accessory control circuit 201 in the first-byte communication. The accessory control circuit 201 transmits as MISO data a value of 0xA5, which is information indicating the communicable state. In a case where the first-byte communication processing cannot be executed, the accessory control circuit 201 transmits as MISO data a value other than 0xA5.

The camera control circuit B 102 transmits argument MOSI DATA1 corresponding to the command number CMD in the second-byte communication. From the third byte to the (N−2)th byte, the camera control circuit B 102 similarly transmits the arguments MOSI_DATA2 to MOSI_DATA [N−3] corresponding to the command number CMD. In the second-byte communication, the accessory control circuit 201 transmits as MISO data the command number CMD received in the first byte to the camera control circuit B 102. This configuration enables the camera control circuit B 102 to determine that the accessory control circuit 201 has correctly received the MOSI data.

The accessory control circuit 201 transmits, as MISO data, return value MISO DATA1 corresponding to the command number CMD in the third-byte communication. From the fourth byte to the (N−2)th byte, the accessory control circuit 201 similarly transmits arguments MISO_DATA2 to MISO_DATA [N−4] corresponding to the command number CMD. Assume that the number of arguments and the number of return values are previously determined for each command number. One or both of the argument and the return value may be omitted.

The camera control circuit B 102 transmits checksum data CheckSum_C as MOSI data to the accessory control circuit 201 in the (N−1)th byte communication. The checksum data CheckSum_C is a value calculated by the following expression (1).

$$CheckSum\_C = EXOR(AND(SUM(CMD, MOSI\_DATA1, \ldots, MOSI\_DATA[N-3]), 0xFF), 0xFF) \quad (1)$$

The accessory control circuit 201 transmits 0x00 as MISO data.

The camera control circuit B 102 transmits 0x00 as MOSI data in the Nth-byte communication. The accessory control circuit 201 transmits checksum data CheckSum_A as MISO data. The checksum data CheckSum_A is calculated by the following expression (2) or (3).

In a case where the value of CheckSum_C received by the camera control circuit B 102 in the (N−1)th-byte communication and the value of CheckSum_C calculated by the camera control circuit B 102 accord with each other, CheckSum_A is calculated by the following expression (2).

$$CheckSum\_A = EXOR(AND(SUM(0xA5,CMD,MISO\_DATA1, \ldots ,MOSI\_DATA[N-4]),0xFF),0xFF) \quad (2)$$

In a case where the value of CheckSum_C received by the camera control circuit B 102 in the (N−1)th-byte communication and the value of CheckSum_C calculated by the camera control circuit B 102 do not accord with each other, CheckSum_A is calculated by the following expression (3).

$$CheckSum\_A = AND(SUM(0xA5,CMD,MISO\_DATA1,MOST\ DATA[N-4]),0xFF) \quad (3)$$

The contact TC11 is connected with a communication request signal/WAKE for requesting communication from the accessory 200 to the camera control circuit A 101. The communication request signal/WAKE is pulled up to the camera microcomputer power supply VMCU_C via a resistor. The camera control circuit A 101 can receive a communication request from the accessory 200 by detecting a trailing edge in the communication request signal/WAKE.

SDA connected to the contact TC12 and SCL connected to the contact TC13 are signals for performing Inter-Integrated Circuit (I2C) communication in which the camera control circuit A 101 is a communication master. SDA and SCL are open-drain communications pulled up by the camera microcomputer power supply VMCU_C, and have communication frequencies of 100 kbps in this embodiment.

FIG. 4 explains accessory information that the accessory 200 has in an unillustrated nonvolatile memory. As illustrated in FIG. 4, the accessory information is mapped in the memory space at addresses 0x00 to 0x0F, and the accessory information can be read out of the accessory 200 by the I2C communication. In the I2C communication according to this embodiment, a checksum value for read data is added as the final data of the communication. Details of the accessory information will be described below.

An FNC1 signal connected to the contact TC14, an FNC2 signal connected to the contact TC15, an FNC3 signal connected to the contact TC16, and an FNC4 signal connected to the contact TC17 are functional signals whose function is variable according to the type of the attached accessory 200. For example, in a case where the accessory 200 is a microphone device, a signal communicated via TC15 is a voice (audio) data signal, and in a case where the accessory 200 is an illumination device (strobe device), a signal communicated via TC 14 is a signal that notifies the light emission timing.

The contact TC18 as a second ground contact is also connected to GND, and is a contact that serves as a reference potential for the camera 100 and the accessory 200, similarly to the contact TC04. A differential signal D2N connected to the contact TC19 and a differential signal D2P connected to the contact TC20 are data communication signals in which they perform data communications in pairs, and are connected to the camera control circuit B 102. The contact TC21 is connected to GND and can be used not only as a reference potential contact but also as a contact for controlling wiring impedances of the differential signals D2N and D2P. The contact TC21 corresponds to a fourth ground contact.

The accessory 200 has a battery (first power supply) 205 and receives power supply from the battery 205 and also receives power supply from the camera 100 via the camera connector 141 and the accessory connector 211. The accessory control circuit 201 as a control unit of the accessory 200 (accessory control unit) is a circuit that controls the entire accessory 200, and includes a processor (microcomputer) that includes a CPU etc. The battery 205 is, for example, a secondary battery and is rechargeable, but is not limited to this example, and may be a primary battery or an external power supply connected to the accessory 200.

The accessory power supply circuit 202 is a circuit that generates a power supply for supplying power to each circuit in the accessory 200, and includes a DC/DC converter circuit, LDO, a charge pump circuit, and the like. A voltage of 1.8V generated by the accessory power supply circuit 202 is constantly supplied as accessory microcomputer power supply VMCU_A to the accessory control circuit 201. Control over the accessory power supply circuit 202 can provide turning-on and off control over the power supply to each circuit in the accessory 200. The accessory power supply circuit 202 functions as a power receiving unit that receives power from the camera 100.

A charging circuit 204 is a circuit for charging the battery 205 using the power supplied from the camera 100. The accessory control circuit 201 controls the charging circuit 204 to charge the battery 205 in a case where the accessory control circuit 201 can determine that sufficient power is supplied from the camera 100 to perform a charging operation. In this embodiment, the battery 205 is attached to the accessory 200, but the accessory 200 may be operated only by a power supply from the camera 100 without attaching the battery 205. In this case, the charging circuit 204 is unnecessary. The charging circuit 204 is also unnecessary in a case where the battery 205 is a primary battery.

A differential communication circuit 207 is a circuit for performing differential communication with the camera 100, and can communicate data with the camera 100. An external communication IF circuit 208 is an IF circuit for performing data communication with an unillustrated external device, such as an Ethernet communication IF, a wireless LAN communication IF, and a public network communication IF.

The accessory control circuit 201 controls the differential communication circuit 207 and the external communication IF circuit 208 to transmit data received from the camera 100 to the external device and data received from the external device to the camera 100. The functional circuit 206 is a circuit having different functions depending on the type of the accessory 200. The functional circuit 206 is, for example, a light-emitting circuit, a charging circuit, or the like in a case where the accessory 200 is a strobe device. In a case where the accessory 200 is a microphone device, it is a voice codec circuit, a microphone circuit, or the like.

An external connection terminal 209 is a connector terminal for connection to an external device, and is a USB TYPE-C connector in this embodiment. A connection detecting circuit 210 is a circuit for detecting that an external device has been connected to the external connection terminal 209. The accessory control circuit 201 can detect the connection of the external device to the external connection terminal 209 by receiving an output signal of the connection detecting circuit 210.

A power supply switch 203 is a switch for turning on and off the operation of the accessory 200. The accessory control circuit 201 can detect a turning-on position and a turning-off position by reading a signal level of a terminal to which the power supply switch 203 is connected. An operation switch 212 is a switch for operating the accessory 200 and includes a button, a cross key, a slide switch, a dial switch, and the like. In a case where the operation switch 212 is operated, the accessory control circuit 201 detects the operation and executes predetermined processing according to the operation. An accessory display circuit (display unit) 213 is a display disposed in the accessory 200, and includes an LCD panel, an organic EL display panel, or the like. The display contents of the accessory display circuit 213 are updated by the accessory control circuit 201, and the accessory display circuit 213 displays the status, settings, etc. of the accessory 200.

An accessory connector 211 is a connector electrically connectable to the camera 100 via 21 contacts TA01 to TA21 that are arranged in a row. The contacts TA01 to TA21 are arranged in this order from one end to the other end in the arrangement direction.

The contact TA01 is connected to GND and serves not only as a reference potential contact but also as a contact for controlling wiring impedances of the differential signals D1N and D1P. The contact TA01 corresponds to a third ground contact.

The differential signal MN connected to the contact TA02 and the differential signal D1P connected to the contact TA03 are data communication signals in which they perform data communication in pairs, and are connected to the differential communication circuit 207. The contacts TA02, TA03, TA07 to TA17 described below, TA19 and TA20 are communication contacts.

The contact TA04 as a first ground contact is connected to GND and serves as a reference potential contact for the camera 100 and the accessory 200. The contact TA04 is disposed outside the contact TAOS described below in the arrangement direction of the contacts. The accessory power supply circuit 202 and the charging circuit 204 are connected to TAOS as a power supply contact, and the accessory power supply VACC supplied from the camera 100 is connected to the contact TAOS. The contact TA06 as an attachment detecting contact is directly connected to GND. In a case where the accessory 200 is attached to the camera 100, the contact TA06 turns the accessory attachment detecting signal/ACC_DET described above to a low level (ground (GND) potential). Thereby, the camera 100 can detect the attachment of the accessory 200. SCLK connected to the contact TA07 as a communication contact, MOSI connected to the contact TA08, MISO connected to the contact TA09, and CS connected to the contact TA10 are signals for the accessory control circuit 201 to act as a communication slave to perform SPI communication. A communication request signal/WAKE for requesting communication from the accessory control circuit 201 to the camera 100 is connected to the contact TAW In a case where the accessory control circuit 201 determines that communication with the camera 100 is necessary, the accessory control circuit 201 requests the camera 100 for communication by changing the communication request signal/WAKE to a low output. SDA connected to the contact TA12 and SCL connected to the contact TA13 are signals for the I2C communication with the accessory control circuit 201 as a communication slave.

An FNC1 signal connected to the contact TA14, an FNC2 signal connected to the contact TA15, an FNC3 signal connected to the contact TA16, and an FNC4 signal connected to the contact TA17 are functional signals whose functions are variable according to the type of accessory 200. For example, in a case where the accessory 200 is a microphone device, they can be voice data signals, and in a case where the accessory 200 is a strobe device, they can be signals for notifying a light emission timing.

The contact TA18 as a second ground contact is also connected to GND, and is a reference potential contact for the camera 100 and the accessory 200, similar to the contact TA04. The differential signal D2N connected to the contact TA19 and the differential signal D2P connected to the contact TA20 are data communication signals in which they perform data communication in pairs, and are connected to the external connection terminal 209. The contact TA21 is connected to GND and can be used not only as a reference potential contact but also as a terminal for controlling the wiring impedances of the differential signals D2N and D2P. TA21 corresponds to a fourth ground contact.

Figure 5:
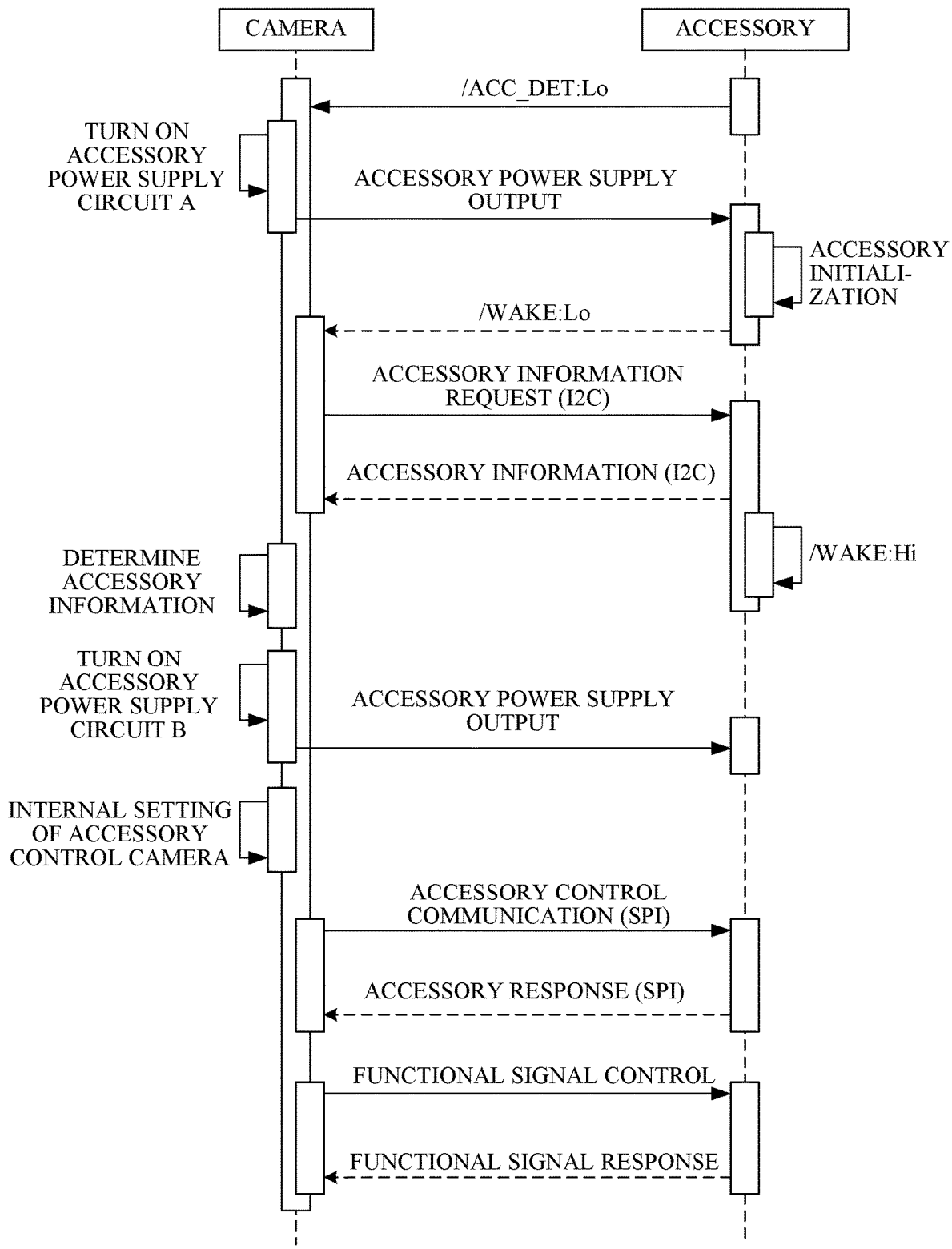
FIG. 5 is operation sequences of the camera and accessory according to each embodiment.

FIG. 5 illustrates operation sequences of the camera 100 and the accessory 200, and an example of processing in a case where the accessory 200 is attached to the camera 100. A detailed description will now be given below of processing of each of the camera 100 and the accessory 200.

In a case where the accessory 200 is attached to the camera 100, the accessory attachment detecting signal/ACC_DET becomes at a GND level, and the camera control circuit A 101 determines that the accessory 200 has been attached to the camera 100. In a case where the camera control circuit A 101 determines that the accessory 200 has been attached, the camera control circuit A 101 sets power supply control signal CNT_VACC1 to a high level in order to turn on the output of the accessory power supply circuit A 131. The accessory power supply circuit A 131 outputs the accessory power supply VACC as soon as the power supply control signal CNT_VACC1 becomes at a high level.

In a case where the accessory power supply circuit 202 receives VACC in the accessory 200, the accessory power supply circuit 202 generates the power supply VMCU_A for the accessory control circuit 201 and the accessory control circuit 201 is started. After the accessory control circuit 201 is started, the accessory control circuit 201 initializes each block in the accessory 200. Thereafter, in a case where the accessory control circuit 201 is ready to communicate with the camera 100, the accessory control circuit 201 sets the communication request signal/WAKE to a low level.

In the camera 100, the camera control circuit A 101 detects that the accessory 200 is in a communicable state by detecting that a/WAKE terminal has become at a low level. The camera control circuit A 101 requests the accessory information by the I2C communication.

In the accessory 200, the accessory control circuit 201 transmits the accessory information in response to the accessory information request from the camera 100. The accessory control circuit 201 in a case where transmitting the accessory information sets the communication request signal/WAKE to a high level.

In the camera 100, the camera control circuit A 101 determines whether or not the attached accessory is controllable etc. by determining the received accessory information. The camera control circuit A 101 turns on the accessory power supply circuit B 132. The camera control circuit A 101 in completing various settings for the camera 100 notifies the camera control circuit B 102 of the accessory information. The camera control circuit B 102 provides the accessory 200 with a notification of a control command and a control of a functional signal by the SPI communication based on the accessory type information. The accessory control circuit 201 responds to the control command by the SPI communication from the camera 100 and performs control in accordance with the functional signal.

Referring now to FIG. 6, a description will now be given of the accessory information. FIG. 6 explains accessory information. D7-D0 data at address 0x00 is information indicating a type of the accessory. For example, 0x81 indicates a strobe device, 0x82 indicates an interface conversion adapter device, 0x83 indicates a microphone device, and 0x84 indicates a multi-accessory connection adapter device for attaching a plurality of accessory devices to the camera 100.

D7-D0 data at address 0x01 is information indicating a model number of the accessory 200. The model of the accessory can be uniquely identified by the accessory type information described above and this information. D7-D0 data at address 0x02 is information indicating a firmware version of the accessory 200.

D7-D6 data at address 0x03 is information indicating whether or not a supply of the accessory power supply VACC to the accessory 200 is to be requested while an unillustrated power supply switch of the camera 100 is turned off. In a case where the information is 0, no power supply is requested. In a case where the information is 1, a power supply is requested by the accessory power supply circuit A 131. In a case where the information is 2, a power supply is requested by the accessory power supply circuit B 132.

D5-D4 data at address 0x03 is information indicating whether or not to request the accessory 200 for a supply of the accessory power supply VACC in a case where the camera 100 is in the power-saving mode. In a case where the information is 0, it means that no power supply is necessary. In a case where the information is 1, it means that there is a power supply requested by the accessory power supply circuit A 131. In a case where the information is 2, it means that there is a power supply requested by the accessory power supply circuit B 132.

D3-D2 data at address 0x03 is information indicating whether or not the accessory 200 has the battery 205. In a case where the information is 0, it means that the accessory 200 has no battery, and in a case where the information is 1, it means that the accessory 200 has the battery. D1-D0 data at address 0x03 is information indicating whether or not the accessory 200 has a charging function for the battery 205. In a case where the information is 0, it means that the accessory 200 has no charging function, and in a case where it is 1, it means that the accessory 200 has the charging function. D7-D0 data at address 0x04 is information indicating required power to the accessory power supply VACC with which the accessory 200 is supplied from the camera 100. A value obtained by multiplying this information by 10 indicates a current value. In a case where this information is 10, it means 100 mA, and in a case where this information is 100, it means 1 A.

In order to reduce an information amount of this information, this information may be simply associated with an arbitrary current value. For example, in a case where this information is 0, it may mean 100 mA, in a case where this information is 1, it may mean 300 mA, in a case where this information is 3, it may mean 450 mA, and in a case where this information is 4, it may mean 600 mA.

D7 data at address 0x05 is information indicating whether or not the accessory 200 is in a firmware update mode state. In a case where the information is 0, it means that the accessory 200 is not in the firmware update mode state, and in a case where it is 1, it means that the accessory 200 is in the firmware update mode state. D6 data at address 0x05 is information indicating whether or not the accessory 200 has a firmware update function. In a case where the information is 0, it means that the accessory 200 has no firmware update function. In a case where the information is 1, it means that the accessory 200 has the firmware update function. D5-D4 data at address 0x05 is information indicating whether or not an operation of the accessory 200 that is attached to an intermediate (connection) accessory is to be permitted (supported). In a case where the information is 0, it means that the operation is not permitted, and in a case where it is 1, it means that the operation is permitted.

D3-D2 data at address 0x05 is information indicating whether or not the accessory 200 needs the camera 100 to confirm an attachment state of the intermediate accessory in a case where the camera 100 is started. In a case where the information is 0, it means that the confirmation is unnecessary, and in a case where it is 1, it means that the confirmation is necessary. D1-D0 data at address 0x05 is information indicating whether or not the accessory 200 supports a command notification by the I2C communication. In a case where this information is 0, it means that the command notification is not supported, and in a case where it is 1, it means that the command notification is supported.

D5-D4 data at address 0x06 is information indicating a communication method that can be used to notify the camera 100 of a factor of a communication request after the accessory 200 notifies the camera 100 of communication request signal/WAKE. In a case where the information is 0, it means that the I2C communication method is supported. In a case where the information is 1, it means that the SPI communication method is supported. In a case where the information is 2, it means that both the I2C communication method and the SPI communication method are supported.

D3-D0 data at address 0x06 is information indicating whether or not the accessory 200 has functions corresponding to the FNC1 signal, the FNC2 signal, the FNC3 signal, and the FNC4 signal. D0 data corresponds to the FNC1 signal, D1 data corresponds to the FNC2 signal, D2 data corresponds to the FNC3 signal, and D3 data corresponds to the FNC4 signal. In a case where the value is 0, it means that the accessory 200 does not have that function. In a case where the value is 1, the accessory 200 has that function.

D7 data at address 0x0A is information indicating whether or not the accessory 200 requests the camera 100 for a start in a case where the accessory 200 notifies the camera 100 of the communication request signal/WAKE. In a case where the information is 0, it means that the start is requested, and in a case where it is 1, it means that the start is not requested. D6-D0 data at address 0x0A is information indicating a factor of the communication request signal/WAKE of which the accessory 200 notifies the camera 100.

FIG. 7 explains a factor number and a factor content of a communication request, and illustrates examples of factors of the communication request signal/WAKE. This embodiment illustrates an example in which the accessory 200 is a microphone device. For example, a factor number 0x00 is a number indicating that a menu call switch in the operation switch 212 has been pressed. A factor number 0x01 is a number indicating that the accessory 200 has completed an output control of an audio signal. A factor number 0x02 is a number indicating that the accessory 200 has completed mute processing of the audio signal. Thus, the camera 100 can be notified of information on the generating factor of the communication request signal/WAKE.

D1 data at address 0x0C is information indicating an SPI communication protocol supported by the accessory 200, and in a case where the information is 0, it means that the accessory 200 supports SPI protocol A, and in a case where it is 1, it means that the accessory 200 supports SPI protocol B. D0 data at address 0x0C is information indicating a control logic of the CS signal in the SPI communication supported by the accessory 200. In a case where the information is 0, it means that the CS signal is a low-active logic, and in a case where it is 1, it means that the CS signal is a high-active logic.

D7-D0 data at address 0x0D is information indicating the time required as a communication byte interval in a case where the accessory 200 performs communication in accordance with the SPI protocol A and the D7 data at the address 0x05 is 0 or the accessory 200 is not in the firmware update mode state. D7-D0 data at address 0x0E is information indicating the time required as a communication byte interval in a case where the accessory 200 performs communication in accordance with the SPI protocol A and the D7 data at the address 0x05 is 1 or the accessory 200 is in the firmware update mode state.

FIGS. 8A and 8B explain communication data interval information on the SPI communication, and illustrates a relationship between information on data at the address 0x0D and data at the address 0x0E and the time between communication bytes. FIG. 8A illustrates the relationship between the time between communication bytes and the data at the address 0x0D, and FIG. 8B illustrates the relationship between the time between communication bytes and the data at the address 0x0E. D7-D0 data at the address 0x0F is information indicating a checksum.

Figure 9:
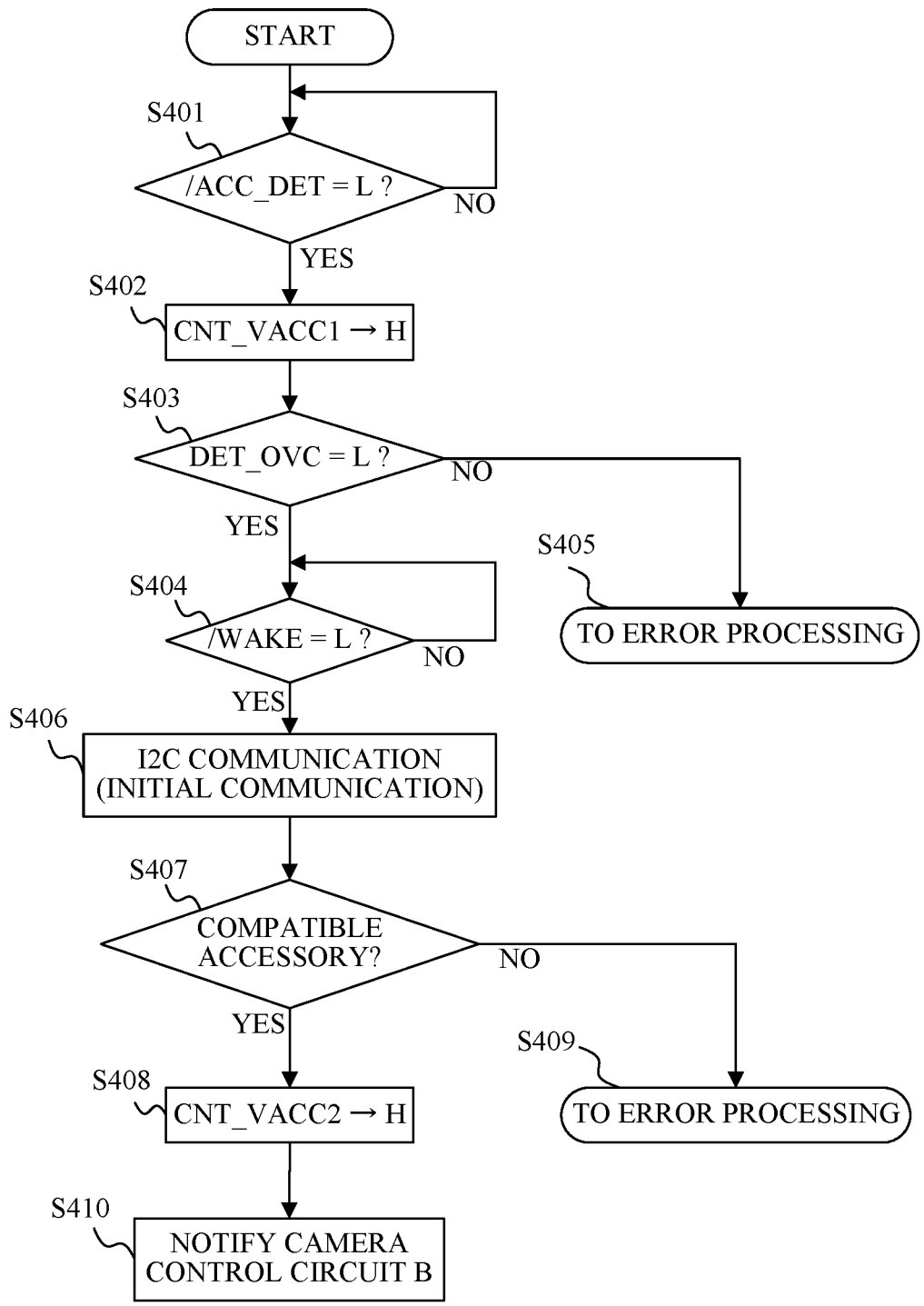
FIG. 9 is a flowchart illustrating an operation of the camera control circuit A according to each embodiment.

FIG. 9 is a flowchart illustrating processing of the camera control circuit A 101 from when the accessory 200 is attached to the camera 100 to when the functions of the accessory 200 are enabled.

In step S401, the camera control circuit A 101 monitors a signal level of the accessory attachment detecting signal/ACC_DET, and determines whether or not the accessory 200 is attached to the camera 100. In a case where the signal level of the accessory attachment detecting signal/ACC_DET is high, the camera control circuit A 101 determines that the accessory 200 has not yet been attached and the flow returns to step S401 so as to again determines whether the accessory 200 has been attached. In a case where the signal level is low, the camera control circuit A 101 determines that the accessory 200 is attached, and the flow proceeds to step S402.

In step S402, the camera control circuit A 101 performs control for changing the power supply control signal CNT_VACC1 to a high level in order to turn on the output of the accessory power supply circuit A 131 and the flow proceeds to step S403. The accessory power supply circuit A 131 outputs the accessory power supply VACC in a case where the power supply control signal CNT_VACC1 becomes at the high level.

Next, in step S403, the camera control circuit A 101 monitors a signal level of the overcurrent detecting signal DET_OVC and determines whether or not an overcurrent is flowing. In a case where the signal level of DET_OVC is low, the camera control circuit A 101 determines that no overcurrent is flowing and the flow proceeds to step S404, and in a case where the signal level is high, the camera control circuit A 101 determines that the overcurrent is flowing, and the flow proceeds to step S405 to perform error processing.

In step S404, the camera control circuit A 101 monitors a signal level of the communication request signal/WAKE as a notification signal from the accessory 200, and determines whether or not an initialization of the accessory 200 has been completed. The camera control circuit A 101 determines that the initialization has been completed in a case where the signal level of the communication request signal/WAKE is low, and the flow proceeds to step S406. In a case where the signal level is high, the camera control circuit A 101 determines that the initialization has not yet been completed and the flow returns to step S404 so as to perform determination processing again.

In step S406, the camera control circuit A 101 performs the I2C communication with the accessory 200 and reads out 15-byte accessory information. Then, the flow proceeds to step S407. In step S407, the camera control circuit A 101 determines whether or not the attached accessory 200 is an device compatible with the camera 100 (compatible accessory) based on the accessory information read out in step S406. In a case where the camera control circuit A 101 determines that the attached accessory 200 is a compatible accessory, the flow proceeds to step S408, and in a case where the camera control circuit A 101 determines that the attached accessory 200 is not a compatible accessory, the flow proceeds to step S409 to perform error processing.

In step S408, the camera control circuit A 101 performs control for changing the power supply control signal CNT_VACC2 to a high level in order to turn on the output of the accessory power supply circuit B 132. Then, the flow proceeds to step S410. The accessory power supply circuit B 132 outputs the accessory power supply VACC in a case where the power supply control signal CNT_VACC2 becomes at the high level. In this embodiment, in a case where control is performed so as to make both the power supply control signals CNT_VACC1 and CNT_VACC2 at high levels, the output from the accessory power supply circuit B 132 is supplied to the accessory power supply VACC. In step S410, the camera control circuit A 101 notifies the camera control circuit B 102 of the accessory information read out in step S406 so as to complete the start flow of the camera 100 in response to the attachment of the accessory 200.

Figure 10:
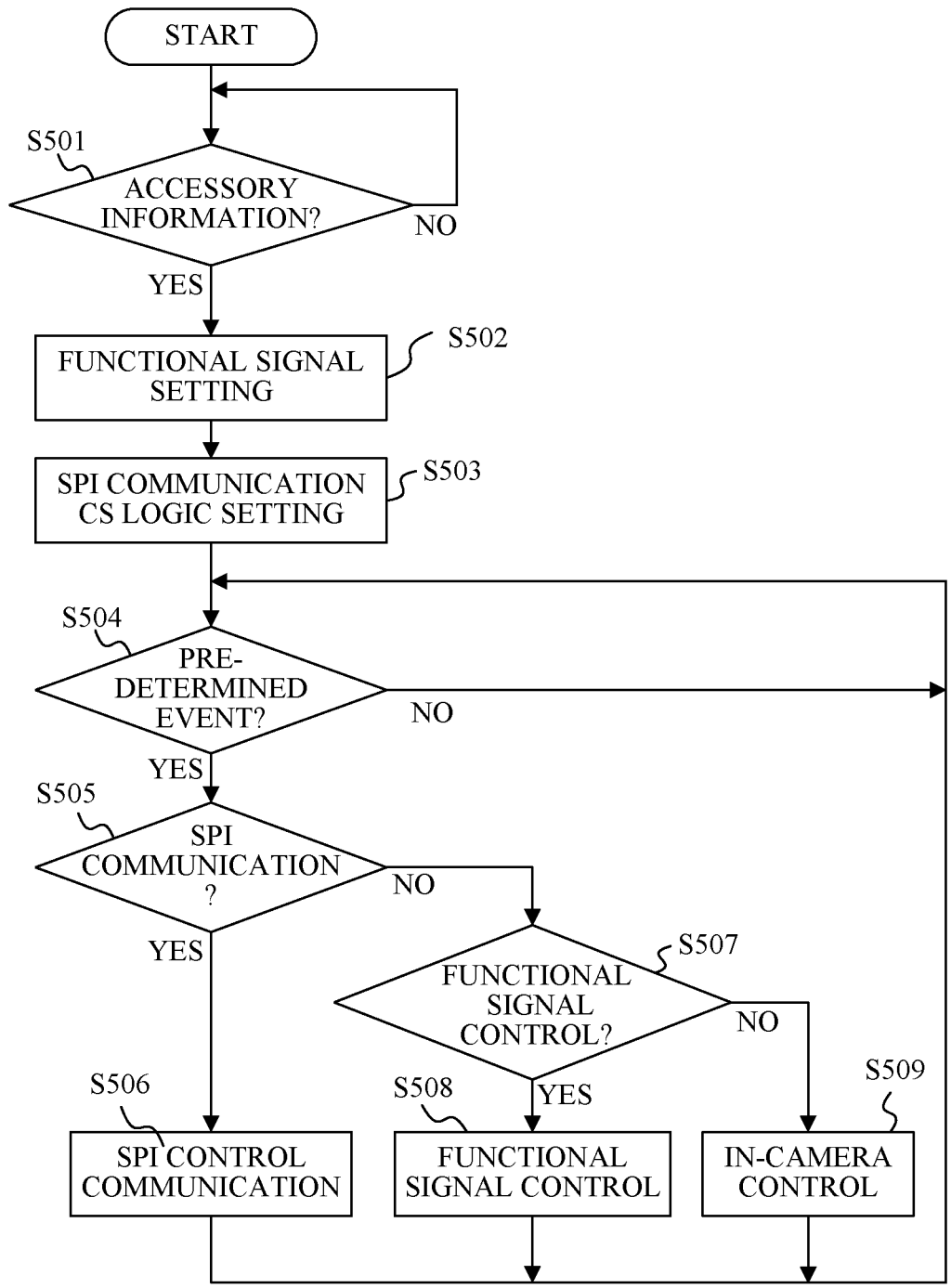
FIG. 10 is a flowchart illustrating an operation of the camera control circuit B according to each embodiment.

FIG. 10 is a flowchart illustrating processing of the camera control circuit B 102 from when the accessory 200 is attached to the camera 100 to when the functions of the accessory 200 are enabled.

In step S501, the camera control circuit B 102 determines whether or not the accessory information has been notified from the camera control circuit A 101. In a case where the accessory information has not yet been notified, the flow returns to step S501 to performs a detection operation again. In a case where the accessory information has been notified, the flow proceeds to step S502.

In step S502, the camera control circuit B 102 sets the functional signals FNC1 to FNC4 based on the accessory information notified from the camera control circuit A 101. For example, in a case where it is notified that the accessory 200 is a microphone device, the camera control circuit B 102 is set so that FNC1 functions as voice data clock signal BCLK, FNC2 functions as voice data channel signal LRCLK, and FNC3 functions as voice data signal SDAT. As another example, in a case where it is notified that the accessory 200 is a strobe device, the camera control circuit B 102 is set so that FNC 4 functions as strobe emission synchronization signal XOUT. For functional signals that do not require control over the accessory 200, the camera control circuit B 102 makes predetermined settings so as not to interfere with operations of the camera 100 and the accessory 200.

Next, in step S503, the camera control circuit B 102 sets the CS control logic in step SPI communication based on the accessory information notified from the camera control circuit A 101. Next, in step S504, the camera control circuit B 102 determines (detects) whether or not a predetermined event for the accessory 200 has occurred. In a case where the camera control circuit B 102 determines that no event has occurred, the flow returns to step S504 and the camera control circuit B 102 performs the determination operation again. In a case where the camera control circuit B 102 determines that the event has occurred, the flow proceeds to step S505.

In step S505, the camera control circuit B 102 determines whether the event determined in step S504 is an event that requires the SPI communication with the accessory 200. The flow proceeds to step S506 in a case where the camera control circuit B 102 determines that the detected event is the event that requires the SPI communication. The flow proceeds to step S507 in a case where the camera control circuit B 102 determines that the detected event is not the event that requires the SPI communication.

In step S507, the camera control circuit B 102 determines whether or not the event determined in step S504 is an event that requires control over the accessory 200 using the functional signal. The flow proceeds to step S508 in a case where the camera control circuit B 102 determines that the detected event is the event that requires the control using the functional signal, and the flow proceeds to step S509 in a case where the camera control circuit B 102 determines that the detected event is not the event that requires the control using the functional signal.

In step S506, the camera control circuit B 102 performs the SPI communication with the accessory 200. The SPI communication performed in step S506 includes, for example, communication of an instruction to turn on or off the microphone operation, communication of an instruction to switch a sound collection directivity of the microphone, communication of an instruction to switch an equalizer function of the microphone, and the like in a case where the accessory 200 is a microphone device. In a case where the accessory 200 is a strobe device, the SPI communication includes communication for reading out setting information on the strobe device, communication for notifying the strobe device of the setting information, and the like. In a case where the predetermined SPI communication in step S506 is completed, the flow returns to step S504 and the camera control circuit B 102 again determines whether or not the event has occurred.

In step S508, the camera control circuit B 102 controls the accessory 200 using a functional signal. Control using function signals executed in step S508 includes, for example, the following controls. In a case where the accessory 200 is a microphone device, the camera control circuit B 102 outputs the audio data clock signal BCLK of FNC1 and the audio data channel signal LRCLK of FNC2, and takes in the audio data signal SDAT of FNC3. Thereby, the camera 100 can acquire voice data from the accessory 200. In a case where the accessory 200 is a strobe device, the camera control circuit B 102 controls the strobe emission synchronization signal XOUT of FNC 4 at a predetermined timing. Thereby, the camera 100 can instruct the strobe device on a light emission. In a case where the control using the predetermined functional signal is completed in step S508, the flow returns to step S504 and the camera control circuit B 102 again detects whether or not the event has occurred.

In step S509, the camera control circuit B 102 performs predetermined in-camera control according to the event detected in step S504. The in-camera control executed by step S509 includes, for example, control for starting or ending recording of voice data in the recording memory 126, control for performing equalizer processing for the voice data, and the like, in a case where the accessory 200 is a microphone device. In a case where the accessory 200 is a strobe device, the in-camera control includes photometric control for accumulating and acquiring light emitted by the strobe device using the image sensor 122, control for calculating an indicated value of a light emission amount of the strobe device, and the like. In a case where the in-camera control is thus completed in step S509, the flow returns to step S504 and the camera control circuit B 102 again detects whether or not the event has occurred. As described above, the camera 100 according to this embodiment can control the attached accessory 200 in accordance with the flowcharts of FIGS. 9 and 10.

Figure 11:
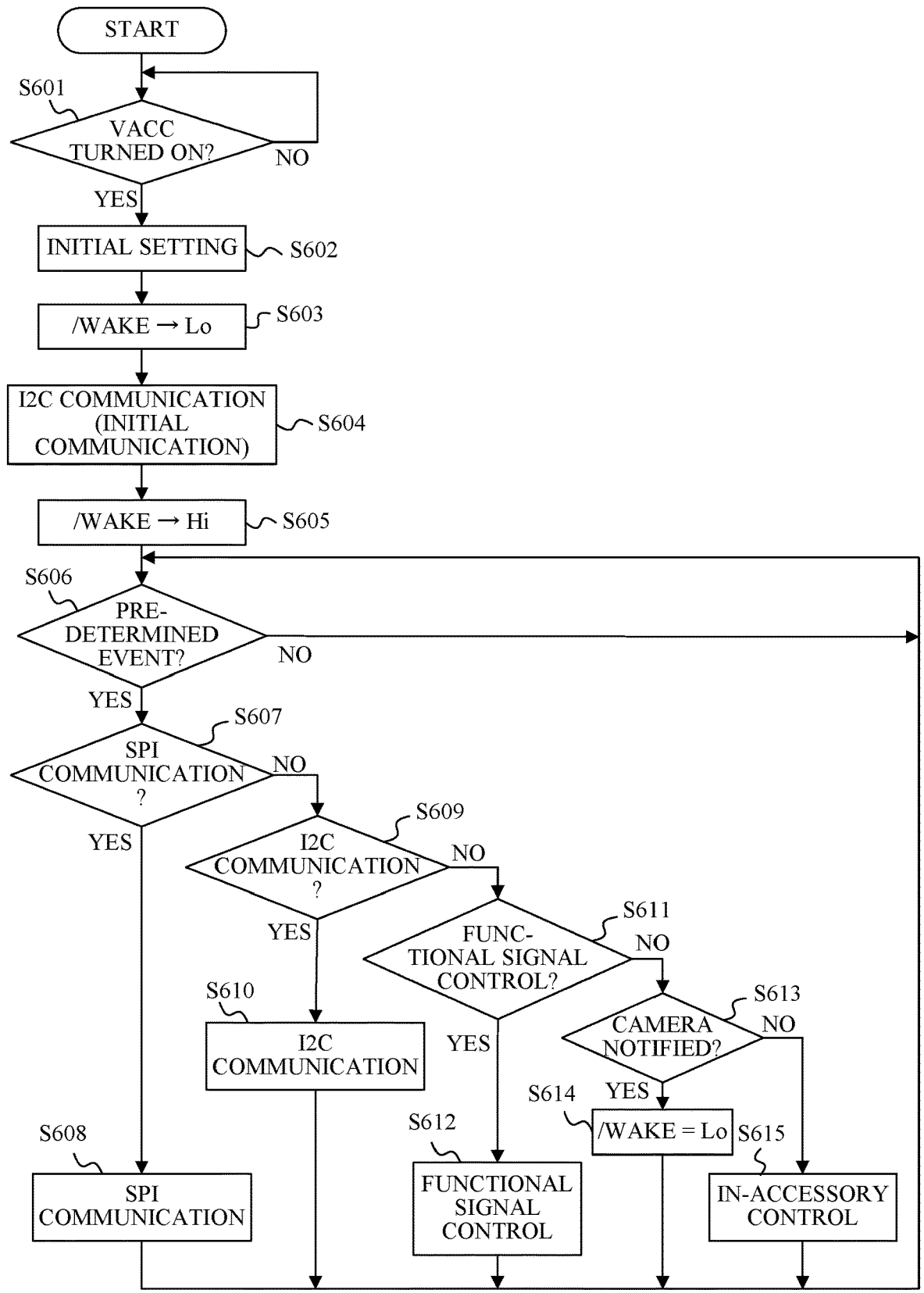
FIG. 11 is a flowchart illustrating an operation of the accessory control circuit according to each embodiment.

FIG. 11 is a flowchart illustrating processing of the accessory control circuit 201 from when the accessory 200 is attached to the camera 100 to when the functions of the accessory 200 are enabled.

In step S601, the accessory control circuit 201 waits for the accessory power supply VACC from the camera 100 to be turned on. In a case where the accessory 200 has no battery 205, turning on of the accessory power supply VACC is detectable in a case where power is supplied to the accessory control circuit 201 and the operation of the accessory control circuit 201 itself is started. In a case where the accessory 200 has the battery 205, the accessory control circuit 201 can detect that the accessory power supply VACC is turned on even in a case where the accessory control circuit 201 monitor the voltage value of the accessory power supply VACC in addition to the above functions.

In step S602, the accessory control circuit 201 makes a predetermined initial setting. For example, the accessory control circuit 201 sets an operating frequency of the microcomputer, an input/output control port of the microcomputer, initialization of a timer function of the microcomputer, and initialization of an interrupt function of the microcomputer. Next, in step S603, the accessory control circuit 201 performs control for changing the communication request signal/WAKE to a low output and the camera 100 is notified that the initial setting is completed. Next, in step S604, the accessory control circuit 201 responds to the I2C communication from the camera 100 and transmits 15-byte accessory information. The accessory information includes various information illustrated in FIG. 4, as described above. Next, in step S605, the accessory control circuit 201 performs control for changing the communication request signal/WAKE to a high level.

Next, in step S606, the accessory control circuit 201 determines whether or not a predetermined event has occurred. In a case where the accessory control circuit 201 determines that no event has occurred, the flow returns to step S606 to perform detection operation again. In a case where the accessory control circuit 201 determines that the event has occurred, the flow proceeds to step S607.

In step S607, the accessory control circuit 201 determines whether or not the event determined in step S606 is an event that requires the SPI communication with the camera 100. The flow proceeds to step S608 in a case where the accessory control circuit 201 determines that the detected event is the event that requires the SPI communication, and the flow proceeds to step S609 in a case where the accessory control circuit 201 determines that the detected event is not the event that requires the SPI communication.

In step S609, the accessory control circuit 201 determines whether or not the event determined in step S606 is an event that requires I2C communication with the camera 100. The flow proceeds to step S610 in a case where the accessory control circuit 201 determines that the detected event is the event that requires the I2C communication, and the flow proceeds to step S611 in a case where the accessory control circuit 201 determines that the detected event is not the event that requires the I2C communication.

In step S611, the accessory control circuit 201 determines whether or not the event detected in step S606 is an event that requires control using a functional signal. The flow proceeds to step S612 in a case where the accessory control circuit 201 determines that the detected event is the event that requires the control using the functional signal, and the flow proceeds to step S613 in a case where the accessory control circuit 201 determines that the detected event is not the event that requires the control using the functional signal.

In step S613, the accessory control circuit 201 determines whether or not the event detected in step S606 is an event that notifies the camera 100 by the communication request signal/WAKE. The flow proceeds to step S614 in a case where the accessory control circuit 201 determines that the detected event is the event that notifies the camera 100 by the communication request signal/WAKE, and the flow proceeds to step S615 in a case where the accessory control circuit 201 determines that the detected event is not the event that notifies the camera 100 by the communication request signal/WAKE.

In step S608, the accessory control circuit 201 performs the SPI communication with the camera 100. In a case where the communication request signal/WAKE is at a low output state in a case where the accessory control circuit 201 executes the SPI communication, the accessory control circuit 201 performs control for changing the communication request signal/WAKE to a high output state after the SPI communication. The SPI communication executed in the step S608 includes, for example, communication of an instruction to turn on a microphone operation from the camera 100, communication of an instruction to turn off the microphone operation, and communication of an instruction to switch a sound collection directivity of the microphone, in a case where the accessory 200 is a microphone device. The SPI communication further includes communication of an instruction to switch an equalizer function of the microphone. In a case where the accessory 200 is a strobe device, the SPI communication includes communication for reading out setting information on the strobe device, communication for notifying the strobe device of the setting information, and the like. In a case where the predetermined SPI communication in step S608 is completed, the flow returns to step S606 and the accessory control circuit 201 again detects whether or not the event has occurred.

In step S610, the accessory control circuit 201 performs the I2C communication with the camera 100. In a case where the communication request signal/WAKE is at a low output state in a case where the SPI communication is executed, the accessory control circuit 201 performs control for changing the communication request signal/WAKE into a high output state after the I2C communication. The I2C communication executed in step S610 includes, for example, communication for reading out a communication request factor for the signal notification of the communication request signal/WAKE of which the accessory control circuit 201 has notified the camera 100. In a case where the predetermined I2C communication in step S610 is completed, the flow returns to step S606 and the accessory control circuit 201 again detects whether or not the event has occurred.

In step S612, the accessory control circuit 201 controls the camera 100 using a functional signal. The control using the functional signal executed in step S612 includes, for example, reception control of the audio data clock signal BCLK of FNC1 and the audio data channel signal LRCLK of FNC2 output from the camera 100, in a case where the accessory 200 is a microphone device, and output control of the voice data signal SDAT of FNC3 in synchronization with these signals. In a case where the accessory 200 is a strobe device, the control includes reception control of the strobe emission synchronization signal XOUT of FNC4 for strobe emission control. In a case where the control using the functional signal in step S612 is completed, the flow returns to step S606 and the accessory control circuit 201 again detects whether or not the event has occurred.

In step S614, the accessory control circuit 201 stores a communication request factor number to the camera 100 in response to the event determined in step S606 in an unillustrated volatile memory of the accessory 200, and performs control for changing the communication request signal/WAKE to a low output. The communication request factor number is a unique number assigned to each factor content as explained with reference to FIG. 7. In a case where the low output control of the communication request signal/WAKE in step S614 is completed, the flow returns to step S606 and the accessory control circuit 201 again determines whether the event has occurred.

In step S615, the accessory control circuit 201 performs in-accessory control according to the event determined in step S606. The in-accessory control executed in step S615 includes, for example, detecting control of a remaining battery level, detecting control of an operation of the operation switch 212, and the like, in a case where the accessory 200 includes the battery 205. In a case where the in-accessory control in step S615 is completed, the flow returns to step S606 and the accessory control circuit 201 again detects whether the event has occurred. In accordance with the flowchart of FIG. 11, the accessory 200 according to this embodiment can perform functional operations after the accessory 200 is attached to the camera 100.

A description will now be given of each embodiment regarding a method for updating the firmware (software for executing the functions of the accessory 200) stored in the memory in the accessory 200 (the internal memory of the accessory control circuit 201, etc.) in the image pickup system 10.

First Embodiment

A description will now be given of a firmware updating method according to a first embodiment. This embodiment will discuss a firmware updating method in a case where the battery (first power supply) 205 in the accessory 200 is a primary battery.

Figure 12A:
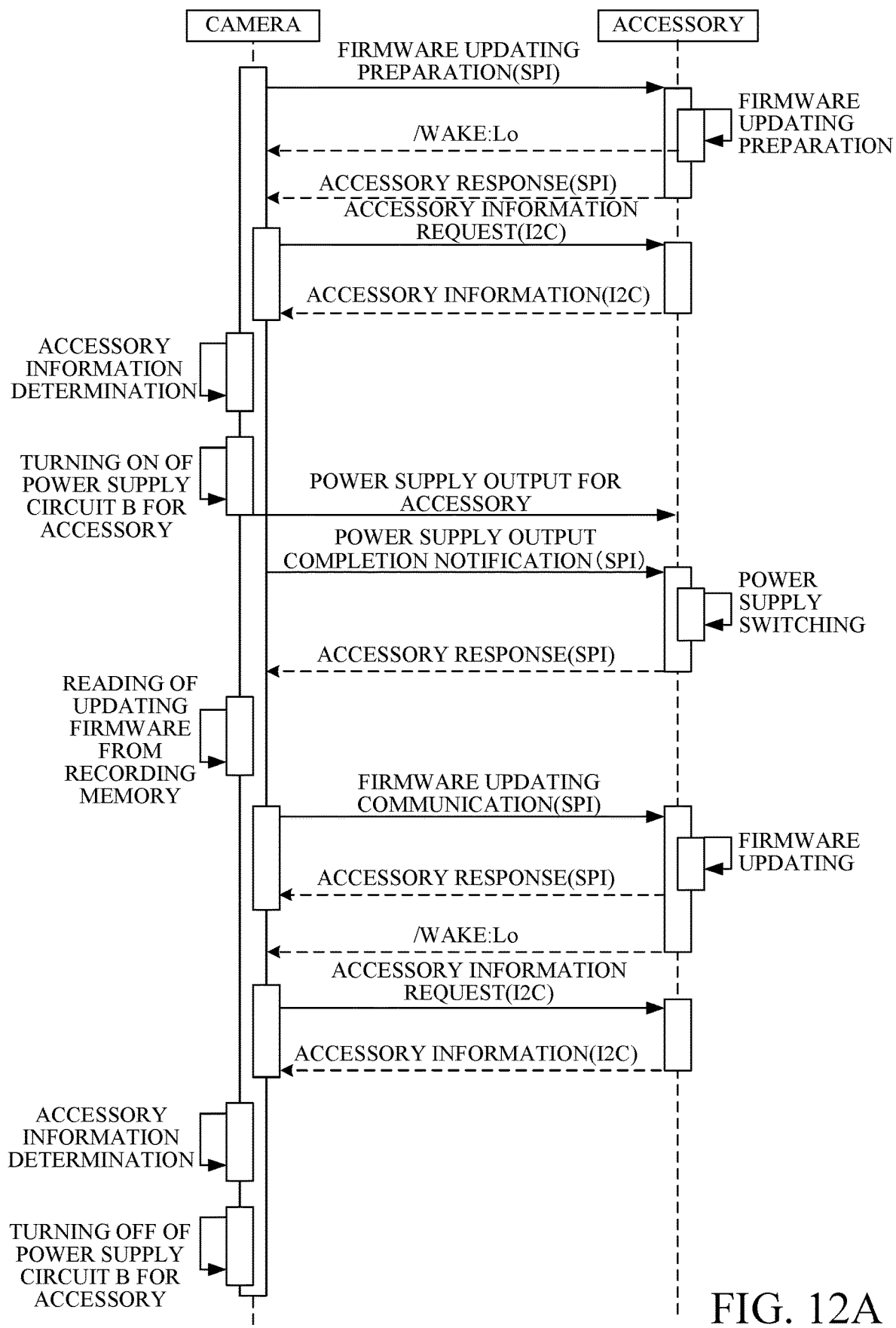
FIG. 12A is an operation sequence during firmware updating in first to third embodiments.

FIG. 12A is an operation sequence for updating the firmware, and illustrates an example of updating the firmware in the accessory 200 using updating data for the accessory 200 recorded in the recording memory 126 of the camera 100. The camera 100 performs a firmware update preparation communication with the accessory 200 before starting updating the firmware in the accessory 200. The accessory 200 that has received the communication prepares for updating, and issues a communication request to the camera 100 by outputting the communication request signal/WAKE to a low level.

The camera 100 that has received the communication request requests accessory information, and the accessory 200 that has received the request transmits the accessory information. At this time, the accessory 200 updates the accessory information to the power for the firmware updating operation and the firmware updating mode state. The camera 100 that has received the accessory information turns on the output of the accessory power supply circuit B132 and notifies the accessory 200 that the power has been turned on.

The accessory 200 notified of the power supply from the camera 100 controls the accessory power supply circuit 202 to switch from the battery (first power supply) 205 to the power supply from the camera 100 (second power supply). At this time, the accessory 200 switches the display of the battery type displayed on the accessory display circuit 213 to the display of the power supplied from the camera 100.

The camera 100 reads the updating data for the accessory 200 from the recording memory 126 and transmits it to the accessory 200 by communication. The accessory 200 updates the firmware using the received updating data. In a case where the update is completed, the accessory 200 controls the accessory power supply circuit 202 to switch the power supply (second power supply) supplied from the camera 100 to the battery (first power supply) 205. The accessory 200 changes the display of the battery type displayed on the accessory display circuit 213 to that indicating the battery 205. In a case where the switching is completed, the accessory 200 makes a communication request by setting the communication request signal/WAKE to low output.

The camera 100 that has received the communication request requests the accessory 200 for accessory information, and the accessory 200 that has received the request transmits the accessory information. At this time, the accessory 200 updates the accessory information to indicate that no power is required and that it is not in the firmware updating mode. The camera 100 that has received the accessory information completes the firmware updating.

Due to the above processing, the image pickup system 10 can avoid an unexpected power-off (power failure) of the accessory 200 during the firmware updating and perform successful firmware updating.

Second Embodiment

Figure 13:
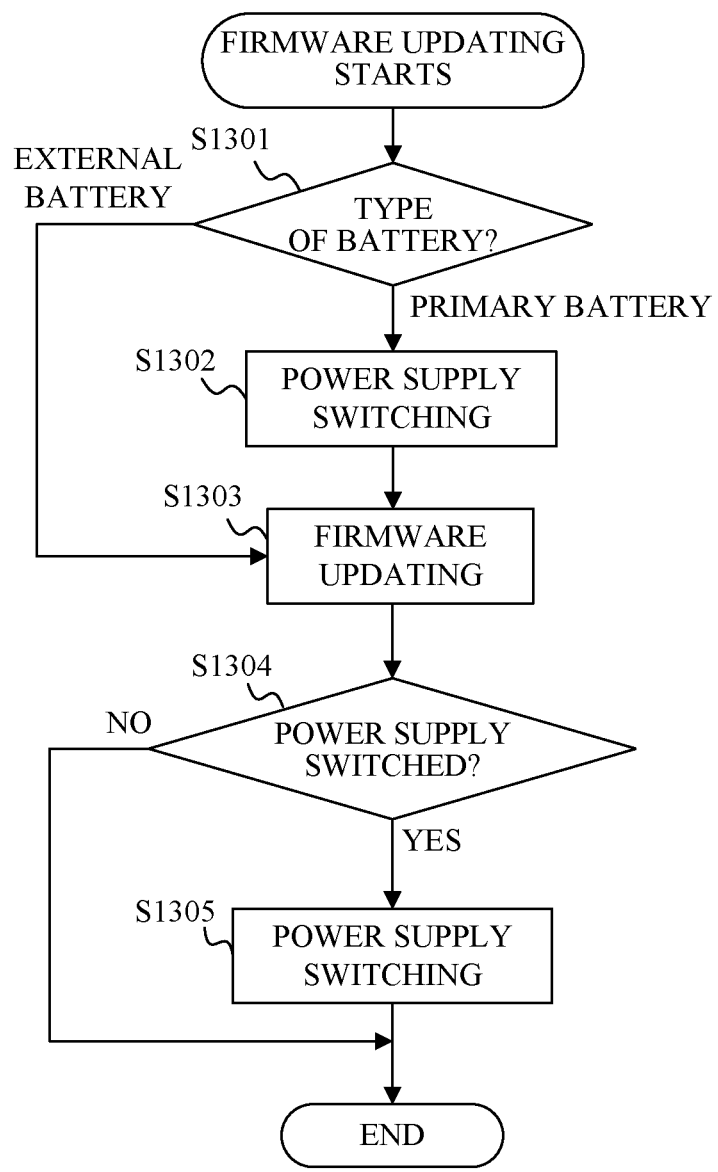
FIG. 13 is a flowchart illustrating operations during firmware updating in the second embodiment.

A description will now be given of a firmware updating method according to a second embodiment. This embodiment will discuss a firmware updating method in a case where an external power supply can be connected to the accessory 200 (in a case where a primary battery or an external power supply can be used as the first power supply). FIG. 13 is a flowchart illustrating the operation in updating firmware according to this embodiment, and indicates a firmware updating method in a case where a battery (primary battery) 205 and an external power supply can be used.

First, in step S1301, the accessory 200 determines whether the type of the battery (first power supply) 205 is a primary battery or an external power supply. In a case where it is determined that the first power supply is the primary battery, the flow proceeds to step S1302. On the other hand, in a case where it is determined that the first power supply is the external power supply, the flow proceeds to step S1303.

Figure 14A:
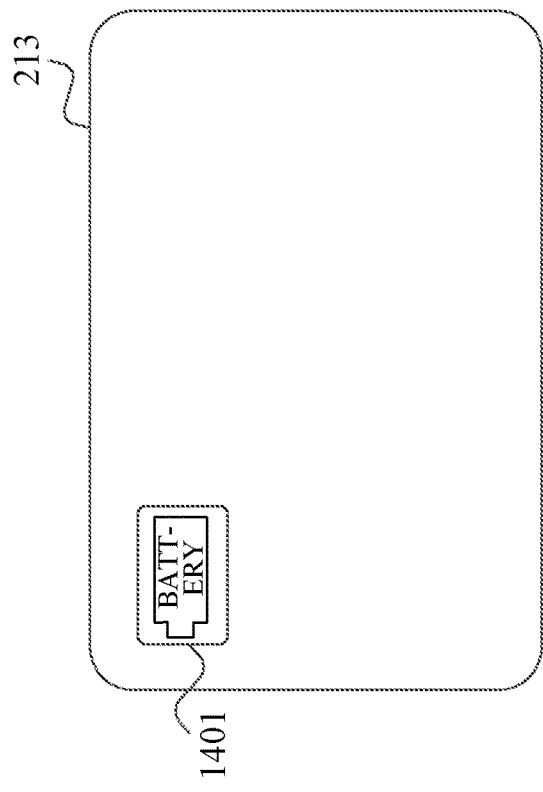
FIGS. 14A, 14B, 14C, and 14D explain accessory power state displays in the second and third embodiments.
Figure 14B:
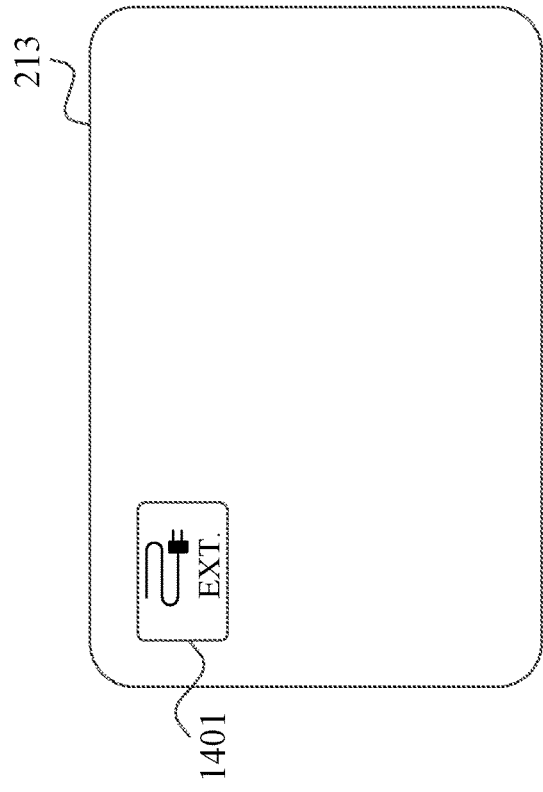
Figure 14C:
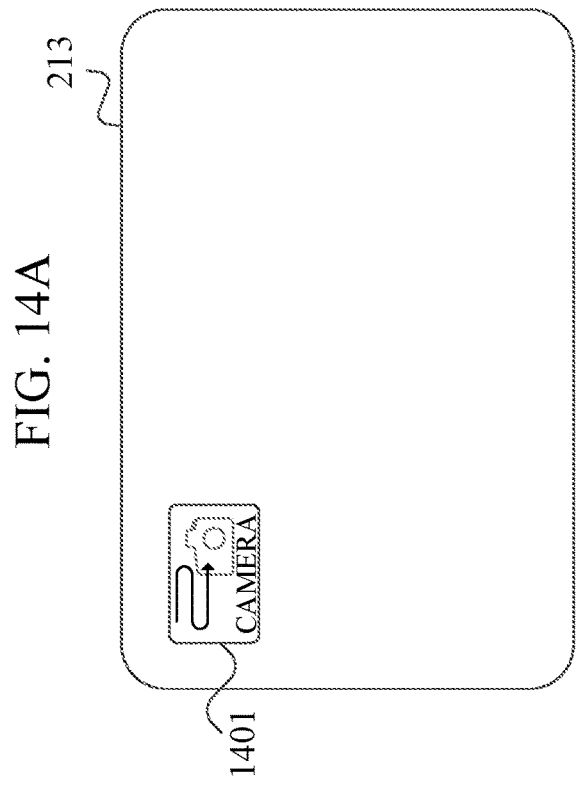

FIGS. 14A, 14B, and 14C explain the power supply state display of the accessory 200, and illustrate a specific display example of the accessory display circuit 213. A power supply state display area 1401 displays the current power supply state. FIG. 14A illustrates the case where accessory 200 is powered by the primary power supply. FIG. 14B illustrates the case where accessory 200 is powered by the external power supply.

In step S1302, the accessory 200 communicates to supply power from the camera 100 and switches the power supply of the accessory 200 from the battery 205 to the power supplied by the camera 100. At this time, the accessory display circuit 213 switches to the display illustrated in FIG. 14C, indicating that the camera 100 is supplying power.

Next, in step S1303, the accessory 200 updates the firmware based on the firmware updating information transmitted from the camera 100. Next, in step S1304, the accessory 200 determines whether or not the power supply has been switched in step S1302. In a case where it is determined that the power supply has been switched, the flow proceeds to step S1305. On the other hand, in a case where it is determined that the power supply has not yet been switched, the accessory 200 completes the firmware updating processing.

In step S1305, the accessory 200 switches power from the power supply (second power supply) supplied from the camera 100 to the battery (first power supply) 205, and communicates with the camera 100 to request the camera 100 to stop supplying power. The accessory 200 switches the display of the accessory display circuit 213 to the display of FIG. 14A.

Figure 12B:
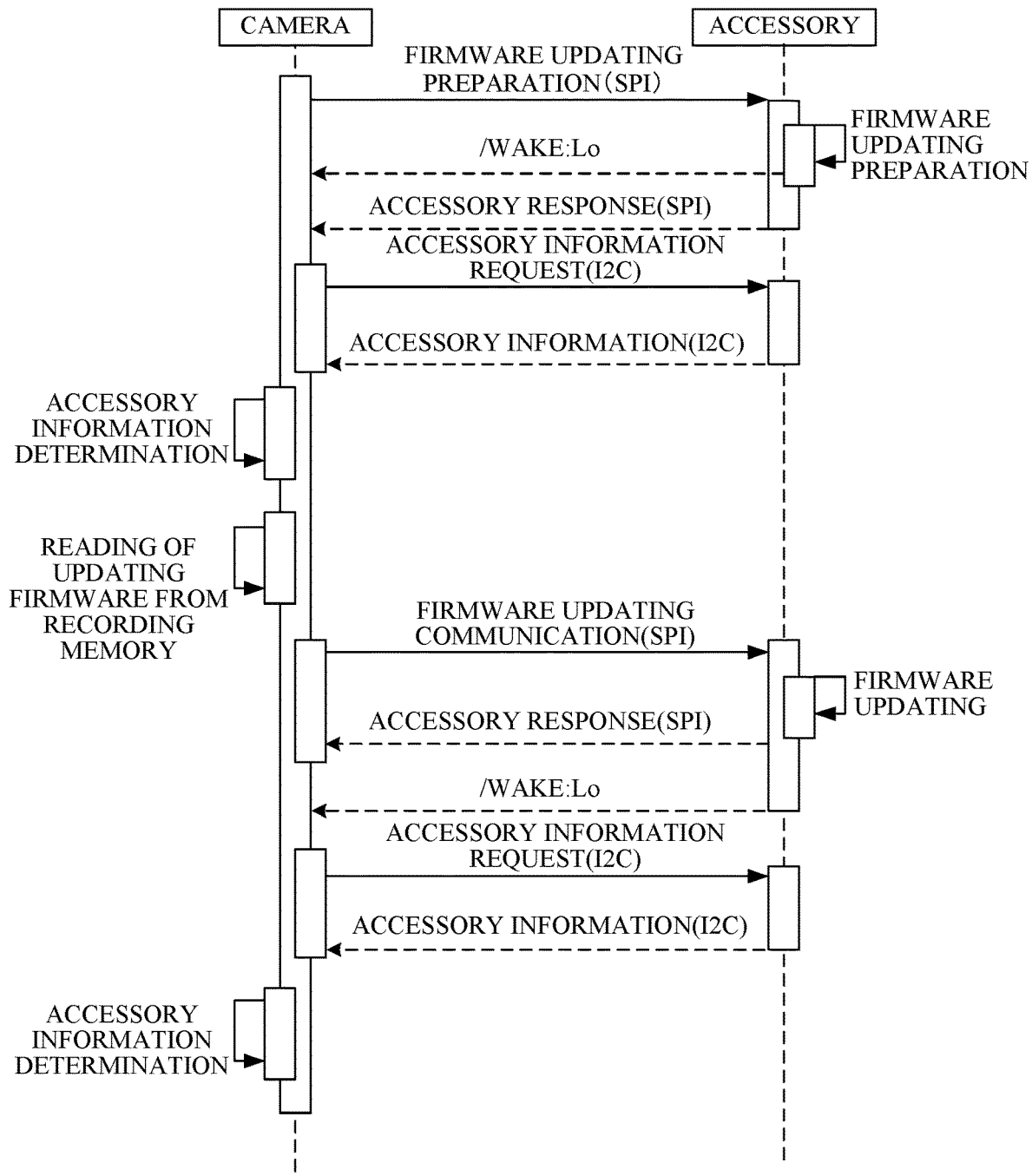
FIG. 12B is an operation sequence during firmware updating in the second to fourth embodiments.

FIG. 12A is an operation sequence illustrating a case where power supply switching is performed. Since FIG. 12A is as described above, a description thereof will be omitted. FIG. 12B is an operation sequence illustrating a case where power supply switching is not performed. The camera 100 communicates with the accessory 200 to prepare for firmware updating. The accessory 200 that has received the communication prepares for firmware updating, and issues a communication request to the camera 100 by outputting the communication request signal/WAKE to a low level.

The camera 100 that has received the communication request requests accessory information, and the accessory 200 that has received the request transmits the accessory information. At this time, the accessory 200 updates the accessory information to indicate that no power supply is required and that the firmware is in the updating state. The camera 100 that has received the accessory information reads the updating firmware from the recording memory 126 and transmits it to the accessory 200 by communication. The accessory 200 updates the firmware using the received updating data.

In a case where the updating is completed, the accessory 200 switches the communication request signal/WAKE to a low output to request communication. The camera 100 that has received the communication request requests accessory information, and the accessory 200 that has received the request transmits the accessory information. At this time, the accessory 200 updates the accessory information to indicate that it does not require power and that it is not in the firmware update state. The camera 100 that has received the accessory information completes the firmware updating.

Due to the above processing, the image pickup system 10 can perform stable firmware update according to the power supply state of the accessory 200.

Third Embodiment

Figure 15:
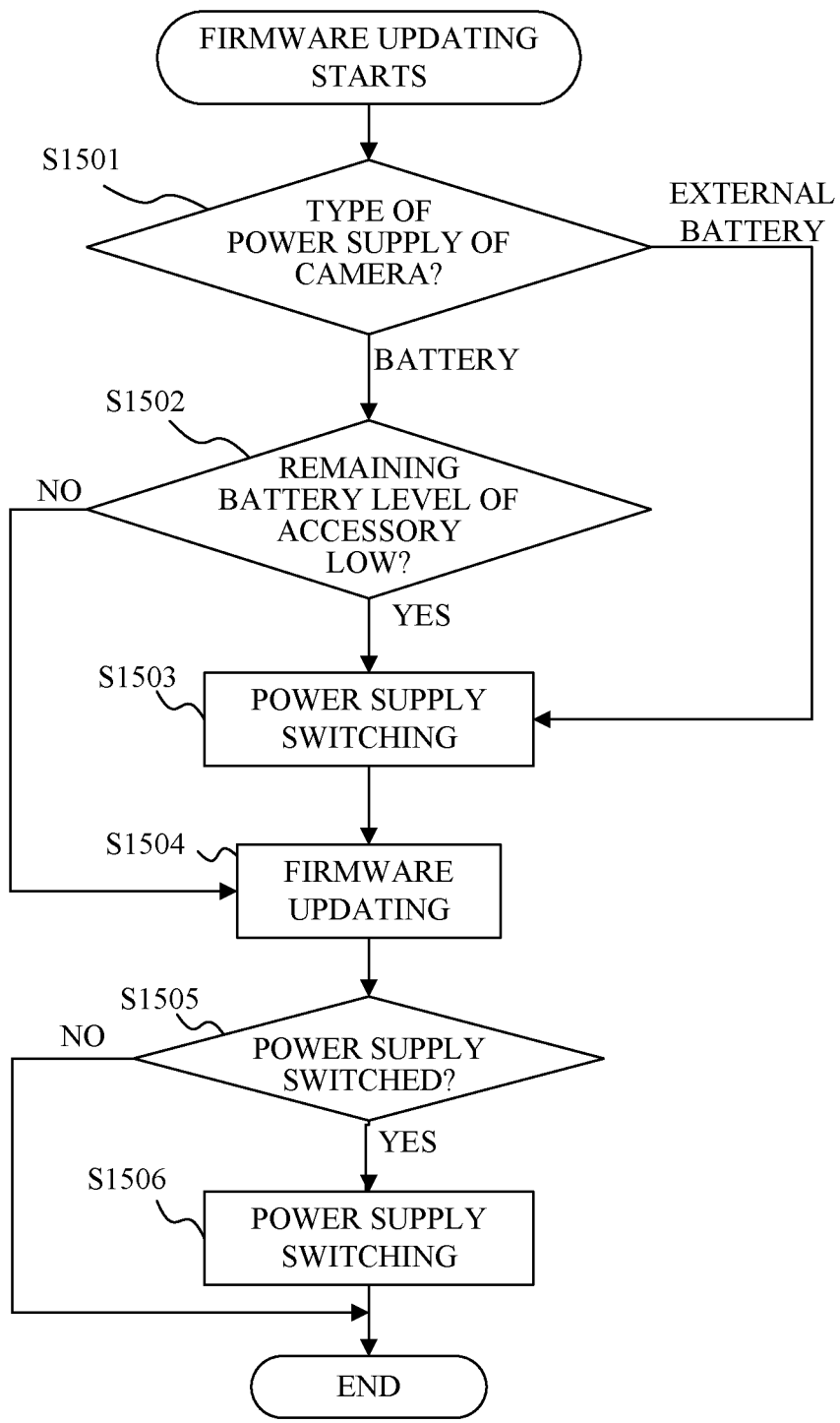
FIG. 15 is a flowchart illustrating an operation during firmware updating in the third embodiment.

A description will now be given of a firmware updating method according to a third embodiment. This embodiment will discuss a firmware updating method in a case where the battery (first power supply) 205 of the accessory 200 is a secondary battery. FIG. 15 is a flowchart illustrating an operation in updating the firmware according to this embodiment, and indicates a firmware updating method in determining the remaining amount of the battery 205.

First, in step S1501, the camera 100 determines whether the power supply (second power supply) that supplies power to the camera 100 is the battery 111 or external power supply. In a case where it is determined that the camera 100 is connected to the external power supply, the flow proceeds to step S1503. On the other hand, in a case where it is determined that the power supply of the camera 100 is the battery 111, the flow proceeds to step S1502.

Figure 14D:
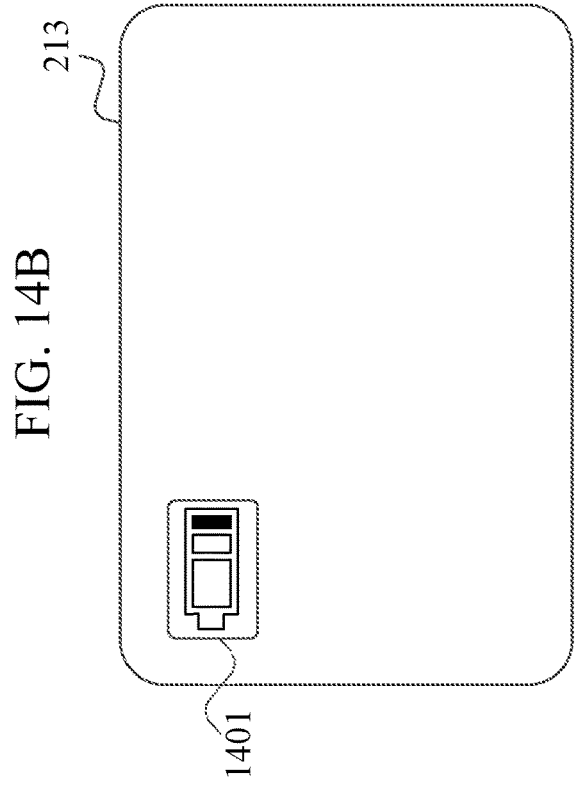

In step S1502, the camera 100 or the accessory 200 determines whether the battery (first power supply) 205 has a low remaining battery level (whether the remaining battery level is lower than a predetermined amount). In a case where it is determined that the remaining battery level is low, the flow proceeds to step S1503. On the other hand, in a case where it is determined that the remaining battery level is not low, the flow proceeds to step S1504. FIG. 14D illustrates a low remaining battery level displayed in the power supply state display area 1401 of the accessory display circuit 213.

In step S1503, the accessory 200 communicates so as to receive power supply from the camera 100, and switches the power of the accessory 200 from the battery (first power supply) 205 to the power (second power supply) supplied from the camera 100. At this time, the accessory display circuit 213 switches to the display illustrated in FIG. 14C, indicating that the camera 100 is supplying power.

Next, in step S1504, the accessory 200 updates the firmware based on the firmware updating information transmitted from the camera 100. Next, in step S1505, the accessory 200 determines whether or not the power supply has been switched in step S1503. In a case where it is determined that the power supply has been switched, the flow proceeds to step S1506. On the other hand, in a case where it is determined that the power supply has not been switched, the accessory 200 completes the firmware updating processing.

In step S1506, the accessory 200 switches the power of the accessory 200 from the power (second power supply) supplied from the camera 100 to the battery (first power supply) 205, and communicates with the camera 100 to stop the power supply. The accessory 200 also switches the display of the accessory display circuit 213 to the display illustrated in FIG. 14A.

FIG. 12A is a sequence in a case where power is switched, and FIG. 12B is a sequence in a case where power is not switched. Since the details are as described above, a description thereof will be omitted.

Due to the above processing, the image pickup system 10 can perform stable firmware updating according to the power supply state of the accessory 200.

Fourth Embodiment

Figure 16:
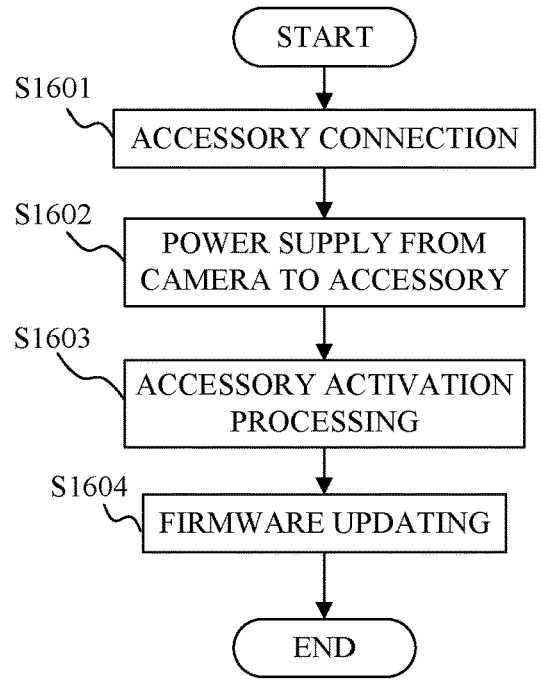
FIG. 16 is a flowchart illustrating operations of the camera and accessory in the fourth embodiment.

A description will now be given of a firmware updating method according to a fourth embodiment. This embodiment will discuss a firmware updating method in a case where the battery 205 is not attached to the accessory 200. FIG. 16 is a flowchart illustrating an operation in the firmware update according to this embodiment, and indicates a firmware updating method in a case where the battery 205 is not attached to the accessory 200. FIG. 16 illustrates a case where the accessory 200 with the battery 205 not installed is connected to the camera 100, but the basic operation is as described with reference to FIG. 5, and a detailed description thereof will be omitted.

First, in step S1601, the accessory 200 is connected to the camera 100. Next, in step S1602, the accessory 200 requests the camera 100 for power supply, and receives power supply from the camera 100. Next, in step S1603, the accessory 200 performs activation processing. Next, in step S1604, the camera 100 updates the firmware of accessory 200 according to the sequence illustrated in FIG. 12B.

Figure 17:
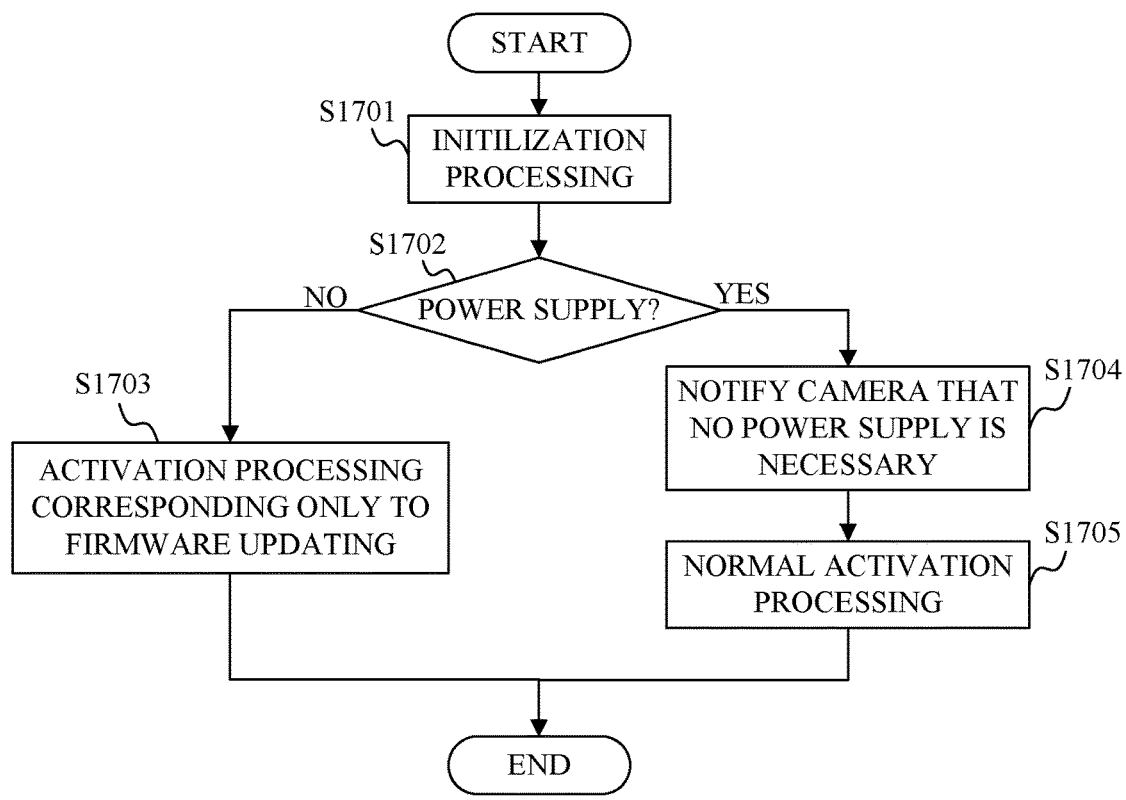
FIG. 17 is a flowchart illustrating an operation of the accessory in the fourth embodiment.

FIG. 17 is a flowchart illustrating the activation processing in step S1603. The accessory 200 that receives the power supply starts an operation with the supplied power. First, in step S1701, the accessory 200 performs a minimum necessary initialization processing for the operation. Next, in step S1702, the accessory 200 determines whether or not the battery (first power supply) 205 is attached. In a case where it is determined that the battery 205 is not attached, the flow proceeds to step S1703, which is limited function activation that allows firmware updating only. On the other hand, in a case where it is determined that the battery 205 is attached, the flow proceeds to normal activation processing in step S1704.

In step S1703, the accessory 200 performs initialization processing necessary for firmware updating and terminates the activation processing. In step S1704, the accessory 200 notifies the camera 100 that power supply is unnecessary. Next, in step S1705, the accessory 200 performs normal start-up processing.

Due to the above processing, the image pickup system 10 can update the firmware even in a case where the battery 205 of the accessory 200 is not attached.

This embodiment can provide an image pickup apparatus that can avoid updating failure due to power failure of the accessory in a case where the image pickup apparatus updates software stored in the accessory.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-141705, filed on Sep. 6, 2022, which is hereby incorporated by reference herein in its entirety.

What is claimed is:

1. An image pickup apparatus attachable to and detachable from an accessory, the image pickup apparatus comprising:
a communication unit configured to communicate with the accessory;
a power supplying unit configured to supply power to the accessory;
a memory configured to store instructions; and
a processor configured to execute the instructions and instruct the accessory to update software stored in the accessory via the communication unit,
wherein the accessory is operable with power supplied from a first power supply provided in the accessory,
wherein the image pickup apparatus is operable with power supplied from a second power supply provided in the image pickup apparatus, and
wherein the processor supplies the power from the second power supply to the accessory in updating the software.

2. The image pickup apparatus according to claim 1, wherein the processor starts updating the software after the processor starts supplying the power from the second power supply to the accessory via the power supplying unit.

3. The image pickup apparatus according to claim 2, wherein the processor stops supplying the power from the second power supply to the accessory after updating the software is completed.

4. An accessory attachable to and detachable from an image pickup apparatus, the accessory comprising:
a communication unit configured to communicate with the image pickup apparatus;
a power receiving unit configured to receive power from the image pickup apparatus;
a memory storing software for controlling the accessory; and
a processor configured to control the accessory based on the software,
wherein the accessory is operable with power supplied from a first power supply provided in the accessory,
wherein the image pickup apparatus is operable with power supplied from a second power supply provided in the image pickup apparatus, and
wherein the processor updates the software stored in the memory using the power supplied from the second power supply.

5. The accessory according to claim 4, wherein the first power supply is a primary battery.

6. The accessory according to claim 5, wherein the accessory is connectable to an external power supply configured to supply power to the accessory, and
wherein the processor updates the software using the power supplied from the external power supply without using the second power supply in a case where the accessory operates with the power supplied from the external power supply.

7. The accessory according to claim 4, further comprising a display unit,
wherein the display unit displays information indicating which of the first power supply and the second power supply the accessory is operating with the power supplied from.

8. The accessory according to claim 4, wherein the processor starts updating the software after switching operating power supply of the accessory from the first power supply to the second power supply.

9. The accessory according to claim 8, wherein the processor switches the operating power supply of the accessory from the second power supply to the first power supply after updating the software is completed.

10. The accessory according to claim 4, wherein the first power supply is a secondary battery.

11. The accessory according to claim 10, wherein the processor requests the image pickup apparatus for the power from the second power supply in a case where it is determined that a remaining amount of the secondary battery is smaller than a predetermined amount, and
wherein the processor does not request the image pickup apparatus for the power from the second power supply in a case where it is determined that the remaining amount of the secondary battery is larger than the predetermined amount.

12. The accessory according to claim 10, wherein in a case where the image pickup apparatus operates with the power supplied from an external power supply in updating the software, the processor requests the image pickup apparatus for the power from the second power supply regardless of a remaining amount of the secondary battery.

13. The accessory according to claim 10, wherein the processor updates the software with the power from the second power supply in a case where the secondary battery is not attached to the accessory.

14. An image pickup system comprising:
an image pickup apparatus; and
an accessory attachable to and detachable from the image pickup apparatus,
wherein the accessory include:
an accessory communication unit configured to communicate with the image pickup apparatus;
a power receiving unit configured to receive power from the image pickup apparatus;
a memory storing software for controlling the accessory; and
an accessory processor configured to control the accessory based on the software, wherein the image pickup apparatus includes:
a camera communication unit configured to communicate with the accessory;
a power supplying unit configured to supply the power to the accessory; and
a camera processor configured to instruct the accessory to update the software via the camera communication unit,
wherein the accessory is operable with power supplied from a first power supply provided in the accessory,
wherein the image pickup apparatus is operable with power supplied from a second power supply provided in the image pickup apparatus,
wherein the camera processor supplies the power from the second power supply to the accessory, and
wherein the accessory processor updates the software with the power supplied from the second power supply.

15. The image pickup system according to claim 14, wherein the camera processor includes two processors, wherein the image pickup apparatus and the accessory are communicable using at least two types of communication methods via the camera communication unit and the accessory communication unit, and wherein the camera communication unit is connected to the two processors, and the two processors are independently communicable with the accessory.

16. A control method for an image pickup apparatus attachable to and detachable from an accessory, the control method comprising the steps of:

determining whether power is supplied from an external power supply to the image pickup apparatus, receiving a request for power from the accessory;

when the image pickup apparatus is not receiving power from the external power supply, supplying the power from a second power supply provided in the image pickup apparatus to the accessory in response to the request from the accessory, when the image pickup apparatus is receiving power from the external power supply, supplying the power from the external power supply to the accessory in response to the request from the accessory; and instructing the accessory to update software stored in the accessory with the power from the second power supply.

17. A non-transitory computer-readable storage medium storing a program that causes a computer to execute the control method according to claim 16.

18. A control method for an accessory attachable to and detachable from an image pickup apparatus, the control method comprising the steps of:

transmitting a request for power to the image pickup apparatus;

switching operating power supply of the accessory from a first power supply provided in the accessory to a second power supply provided in the image pickup apparatus; and updating software stored in a memory for controlling the accessory with the power from the second power supply.

19. A non-transitory computer-readable storage medium storing a program that causes a computer to execute the control method according to claim 18.

* * * * *